United States Patent
Abedini et al.

(10) Patent No.: US 11,533,750 B2
(45) Date of Patent: Dec. 20, 2022

(54) RANDOM ACCESS RESPONSE TECHNIQUES BASED ON SYNCHRONIZATION SIGNAL BLOCK TRANSMISSIONS

(71) Applicant: QUALCOMM Incorporated, San Diego, CA (US)

(72) Inventors: Navid Abedini, Somerset, NJ (US); Muhammad Nazmul Islam, Edison, NJ (US); Juergen Cezanne, Ocean Township, NJ (US); Bilal Sadiq, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 131 days.

(21) Appl. No.: 16/144,020

(22) Filed: Sep. 27, 2018

(65) Prior Publication Data
US 2019/0110314 A1 Apr. 11, 2019

Related U.S. Application Data

(60) Provisional application No. 62/588,254, filed on Nov. 17, 2017, provisional application No. 62/570,640, (Continued)

(51) Int. Cl.
*H04W 74/00* (2009.01)
*H04W 74/08* (2009.01)
(Continued)

(52) U.S. Cl.
CPC ......... *H04W 74/008* (2013.01); *H04L 5/0048* (2013.01); *H04L 5/0051* (2013.01);
(Continued)

(58) Field of Classification Search
CPC ........... H04W 74/008; H04W 74/0891; H04W 74/0833; H04W 74/006; H04W 52/0212;
(Continued)

(56) References Cited

U.S. PATENT DOCUMENTS 8,295,243 B2 10/2012 Malladi et al.
2014/0219202 A1 8/2014 Kim et al.
(Continued)

FOREIGN PATENT DOCUMENTS

CN 106489246 A 3/2017
CN 106559905 A 4/2017
(Continued)

OTHER PUBLICATIONS

S. Shailendra, Aniruddh Rao K, B. Panigrahi, H. K. Rath and A. Simha, "Power efficient RACH mechanism for dense IoT deployment," 2017 IEEE International Conference on Communications Workshops (ICC Workshops), Paris, May 1, 2017, pp. 373-378, doi: 10.1109/ICCW.2017.7962686. (Year: 2017).*
(Continued)

*Primary Examiner* — Joshua Kading
(74) *Attorney, Agent, or Firm* — Holland & Hart LLP

(57) ABSTRACT

Methods, systems, and devices for wireless communications are described that provide for transmission of random access preambles from a UE based at least in part on a synchronization signal block (SSB) that is received from a base station. A random access response may be transmitted from the base station based at least in part on a random access resource that is used for the random access preamble, an SSB associated with the random access resource, an SSB index, or combinations thereof. In some cases, two or more SSBs may be mapped to a single random access resource, and a single random access radio network temporary identifier (RA-RNTI), or two or more RA-RNTIs, may be used
(Continued)

for each of the two or more SSBs. In some cases, a single random access response message contains information for each UE that transmits a random access preamble in the single random access resource.

64 Claims, 14 Drawing Sheets

Related U.S. Application Data filed on Oct. 10, 2017, provisional application No. 62/570,087, filed on Oct. 9, 2017.

(51) Int. Cl.
| | |
|---|---|
| *H04W 72/04* | (2009.01) |
| *H04L 5/00* | (2006.01) |
| *H04W 56/00* | (2009.01) |
| *H04W 72/14* | (2009.01) |
| *H04W 72/12* | (2009.01) |
| *H04W 52/02* | (2009.01) |

(52) U.S. Cl.
CPC ....... *H04L 5/0078* (2013.01); *H04W 52/0212* (2013.01); *H04W 56/0015* (2013.01); *H04W 72/042* (2013.01); *H04W 72/0493* (2013.01); *H04W 72/1257* (2013.01); *H04W 72/14* (2013.01); *H04W 74/0833* (2013.01); *H04W 74/0891* (2013.01); *H04W 74/006* (2013.01)

(58) Field of Classification Search
CPC ............. H04W 72/1257; H04W 72/14; H04W 72/0493; H04W 72/042; H04W 56/0015; H04L 5/0051; H04L 5/0078; H04L 5/0048
See application file for complete search history.

(56) References Cited

U.S. PATENT DOCUMENTS

| | | | | |
|---|---|---|---|---|
| 2016/0165640 A1* | 6/2016 | Yang | ..................... | H04W 74/08 370/336 |
| 2016/0295609 A1* | 10/2016 | Vajapeyam | ............... | H04L 5/14 |
| 2017/0048891 A1* | 2/2017 | Quan | .................... | H04W 48/16 |
| 2017/0251460 A1 | 8/2017 | Agiwal et al. | | |
| 2018/0279380 A1* | 9/2018 | Jung | ................. | H04W 56/0005 |
| 2018/0324716 A1* | 11/2018 | Jeon | .................. | H04W 74/0833 |
| 2018/0324853 A1* | 11/2018 | Jeon | .................... | H04W 74/006 |
| 2018/0338308 A1* | 11/2018 | Park | ..................... | H04L 5/0053 |
| 2019/0052487 A1* | 2/2019 | Shelby | ................. | H04L 1/0041 |
| 2019/0090282 A1* | 3/2019 | Shi | ........................ | H04W 76/11 |
| 2019/0335512 A1* | 10/2019 | Shi | .................... | H04W 74/0833 |
| 2019/0349873 A1* | 11/2019 | Ohara | .................. | H04W 52/36 |
| 2020/0029384 A1* | 1/2020 | Hong | ................... | H04W 40/22 |
| 2020/0068619 A1* | 2/2020 | Kim | ................. | H04W 74/0833 |
| 2020/0107373 A1* | 4/2020 | Roy | ....................... | H04L 5/001 |
| 2020/0128582 A1* | 4/2020 | Chen | ................. | H04W 74/085 |
| 2020/0128587 A1* | 4/2020 | Qian | ................. | H04W 74/0833 |
| 2020/0170044 A1* | 5/2020 | Kim | ......................... | H04B 7/08 |

FOREIGN PATENT DOCUMENTS

| | | |
|---|---|---|
| WO | WO-2008024788 | 2/2008 |
| WO | WO-2017155239 A2 | 9/2017 |

OTHER PUBLICATIONS

"3rd Generation Partnership Project; Technical Specification Group Radio Access Network; NR; Physical layer procedures for control (Release 15)", 3GPP Draft; R1-1718782 38.213 V1.0.2, 3rd Generation Partnership Project (3GPP), Mobile Competence Centre, 650, Route Des Lucioles, F-06921 Sophia-Antipolis Cedex, France, No.; Oct. 1, 2017 Oct. 8, 2017, XP051341945, Retrieved from the Internet: URL:http://www.3gpp.org/ftp/Meetings_3GPP_SYNC/RAN1/Docs/ [retrieved on Oct. 8, 2017], 21 pages.
International Search Report and Written Opinion—PCT/US2018/053570—ISA/EPO—dated Dec. 13, 2018.
Taiwan Search Report—TW107134352—TIPO—dated Feb. 23, 2022.
ERICSSON: "Remaining Details on RACH Procedure", 3GPP TSG RAN WG1 Meeting #90bis, 3GPP Draft, R1-1718716 Remaining Details on RACH Procedure, 3rd Generation Partnership Project (3GPP), Mobile Competence Centre, 650, Route Des Lucioles, F-06921 Sophia-Antipolis Cedex, France, vol. RAN WG1, No. Prague, Czech Republic, Oct. 9, 2017-Oct. 13, 2017, Oct. 3, 2017 (Oct. 3, 2017), XP051353213, 21 pages, Retrieved from the Internet: URL: http://www.3gpp.org/ftp/tsg_ran/WG1_RL_1/TSGR1_90b/Docs/. [retrieved on Oct. 3, 2017] p. 15. line 31—p. 16, line 9.
ERICSSON, "Preamble Modelling and Configuration with Multiple SSBs", 3GPP tsg_ran\WG2_RL2, 3GPP TSG-RAN WG2 #99bis, R2-1711176, Prague, Czech Republic, Oct. 9-13, 2017, Sep. 29, 2017, 4 Pages.

\* cited by examiner

RANDOM ACCESS RESPONSE TECHNIQUES BASED ON SYNCHRONIZATION SIGNAL BLOCK TRANSMISSIONS

CROSS REFERENCES

The present Application for Patent claims the benefit of U.S. Provisional Patent Application No. 62/570,087 by Abedini, et al., entitled, "Random Access Response In Beamformed Transmissions," filed Oct. 9, 2017, and to U.S. Provisional Patent Application No. 62/570,640 by Abedini, et al., entitled "Random Access Response Techniques Based On Synchronization Signal Block Transmissions" filed Oct. 10, 2017, and to U.S. Provisional Patent Application No. 62/588,254 by Abedini et al., entitled "Random Access Response Techniques Based On Synchronization Signal Block Transmissions" filed Nov. 17, 2017 and assigned to the assignee hereof, and expressly incorporated herein by reference in their entirety.

BACKGROUND

The following relates generally to wireless communication, and more specifically to random access response techniques based on synchronization signal block transmissions.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In some deployments, such as a NR deployment, a base station may transmit a set of synchronization signal (SS) blocks (sometimes referred to as SSBs), which may be used by a UE to obtain various system information and timing information. In some cases, SS blocks may have associated random access resources that a UE may use, upon detection of the SS block, to transmit a random access request for access to the system through the base station. In some cases, such a system may be a millimeter wave (mmW) system and each SS block may be transmitted in an associated directional beam, and an indication of the SS block that is received at the UE may provide an indication of beamforming parameters that may be used for directional transmission beams to be transmitted to the UE.

SUMMARY

The described techniques relate to improved methods, systems, devices, or apparatuses that support random access response based on SS block transmissions. Generally, the described techniques provide for transmission of random access requests (e.g., random access preambles) from a UE based on a synchronization signal that is received in an SS block (SSB) from a base station. In some cases, the SSB may be transmitted as part of a beam sweeping procedure of the base station.

In some cases, one or more SSBs may be mapped to one or more random access resources for initial access. For example, one SSB may be mapped to one random access resource, multiple SSBs may be mapped to one random access resource, one SSB may be mapped to multiple random access resources, and so forth. In some examples, multiple SSBs may correspond to multiple random access resources associated with a single or multiple RA-RNTIs. In some cases, the RA-RNTI may be determined based on random access resources used by the UE.

In some cases, a resource for transmission of the random access preamble may be determined based on the SSB. In these cases, since the SSBs are mapped to the resources for transmission of the random access preamble and the resources used for transmission of the random access preamble correspond to the RA-RNTI for the UE, the RA-RNTI then may be determined based on the selected SSB. Thus, a random access response may be transmitted from the base station based on a random access resource that is used for the random access preamble, an SSB associated with the random access resource, an SSB index, or combinations thereof. In some cases, two or more SSBs may be mapped to a single random access resource, and a single random access radio network temporary identifier (RA-RNTI), or two or more RA-RNTIs, may be used for each of the two or more SSBs.

In some cases, a random access response (RAR) may be configured to include an indication (e.g., a flag, a bit-map, or additional information) indicating to the UE whether a base station will respond to the UE and/or when a base station may respond to the UE. In such cases, based on the indication, the UE may not engage in or stop performing a blind search for its own RAR when the base station has determined not to respond to that UE, thereby reducing resource overhead, time, power consumption expended by the UE. In some cases, a single random access response message contains information for each UE that transmits a random access preamble in the one or more random access resources. In other cases, two or more random access response messages may contain information for different subsets of UEs that transmit random access preambles in the one or more random access resources.

A method of wireless communication is described. The method may include receiving, at a user equipment (UE), a synchronization signal block (SSB) of a plurality of SSBs transmitted by a base station, identifying random access resources for transmitting a random access preamble based on the received SSB, transmitting the random access preamble to the base station using the random access resources, monitoring for a random access response from the base station within a control channel that includes cyclic redundancy check bits scrambled by a random access radio network temporary identifier (RA-RNTI), determining the RA-RNTI for the UE based on one or more of the identified random access resources, the SSB, or an SSB index of the SSB, and decoding the control channel based on the RA-RNTI.

An apparatus for wireless communication is described. The apparatus may include means for receiving, at a user equipment (UE), a synchronization signal block (SSB) of a plurality of SSBs transmitted by a base station, means for identifying random access resources for transmitting a random access preamble based on the received SSB, means for transmitting the random access request to the base station using the random access resources, means for monitoring for a random access response from the base station within a control channel that includes cyclic redundancy check bits scrambled by a random access radio network temporary identifier (RA-RNTI), means for determining the RA-RNTI for the UE based on one or more of the identified random access resources, the SSB, or an SSB index of the SSB, and means for decoding the control channel based on the RA-RNTI.

Another apparatus for wireless communication is described. The apparatus may include a processor, memory in electronic communication with the processor, and instructions stored in the memory. The instructions may be operable to cause the processor to receive, at a user equipment (UE), a synchronization signal block (SSB) of a plurality of SSBs transmitted by a base station, identify random access resources for transmitting a random access preamble based on the received SSB, transmit the random access preamble to the base station using the random access resources, monitor for a random access response from the base station within a control channel that includes cyclic redundancy check bits scrambled by a random access radio network temporary identifier (RA-RNTI), determine the RA-RNTI for the UE based on one or more of the identified random access resources, the SSB, or an SSB index of the SSB, and decode the control channel based on the RA-RNTI.

A non-transitory computer-readable medium for wireless communication is described. The non-transitory computer-readable medium may include instructions operable to cause a processor to receive, at a user equipment (UE), a synchronization signal block (SSB) of a plurality of SSBs transmitted by a base station, identify random access resources for transmitting a random access preamble based on the received SSB, transmit the random access preamble to the base station using the random access resources, monitor for a random access response from the base station within a control channel that includes cyclic redundancy check bits scrambled by a random access radio network temporary identifier (RA-RNTI), determine the RA-RNTI for the UE based on one or more of the identified random access resources, the SSB, or an SSB index of the SSB, and decode the control channel based on the RA-RNTI.

Some examples of the method, apparatus, and non-transitory computer-readable medium described above may further include processes, features, means, or instructions for determining the RA-RANTI based on a symbol index within a slot. In some examples of the method, apparatus, and non-transitory computer-readable medium described above may further include processes, features, means, or instructions for determining the RA-RANTI based on a slot index within a subframe. In some examples of the method, apparatus, and non-transitory computer-readable medium described above two or more random access responses may be transmitted, corresponding to a first random access resource, and each random access response may be for a different subset of a plurality of UEs.

In some examples of the method, apparatus, and non-transitory computer-readable medium described above may further include processes, features, means, or instructions for determining the RA-RNTI based on the SSB index when a set of SSBs are mapped to a single random access resource. In some examples of the method, apparatus, and non-transitory computer-readable medium described above, the SSB index is a relative SSB index among the set of SSBs that are mapped to the single random access resource. In some examples of the method, apparatus, and non-transitory computer-readable medium described above, the RA-RNTI is independent from the SSB index of the SSB when a single SSB is mapped to a single random access resource.

In some examples of the method, apparatus, and non-transitory computer-readable medium described above, multiple RA-RNTIs may be associated with the same random access resource and may be associated with one or more corresponding SSBs. In some examples of the method, apparatus, and non-transitory computer-readable medium described above, a single RA-RNTI may be associated with multiple random access resources and one or more of the SSBs may be associated with one or more random access resources.

In some examples of the method, apparatus, and non-transitory computer-readable medium described above, a single random access response message, corresponding to a first random access resource, contains information for each UE that transmits a random access preamble within the first random access resource. In some examples of the method, apparatus, and non-transitory computer-readable medium described above, two or more random access responses may be transmitted, and each random access response may be for a different subset of a plurality of UEs.

In some examples of the method, apparatus, and non-transitory computer-readable medium described above, the monitoring for the random access response may include identifying two or more random access responses. Some examples of the method, apparatus, and non-transitory computer-readable medium described above may further include processes, features, means, or instructions for ordering the two or more random access responses based on a quality metric. Some examples of the method, apparatus, and non-transitory computer-readable medium described above may further include processes, features, means, or instructions for attempting to decode the two or more random access responses according to the ordering. Some examples of the method, apparatus, and non-transitory computer-readable medium described above may further include processes, features, means, or instructions for discontinuing the decoding upon successful decoding of one of the two or more random access responses.

In some examples of the method, apparatus, and non-transitory computer-readable medium described above, a first random access response message includes an indication of one or more preamble IDs, one or more SSBs, one or more random access resources, or any combination thereof, for which the first random access response message may be carrying information. In some examples of the method, apparatus, and non-transitory computer-readable medium described above, the indication may include a flag, a bitmap identifying preambles, SSBs, random access resources, specific information for additional random access response messages, or any combination thereof. In some examples of the method, apparatus, and non-transitory computer-readable medium described above, the random access response may indicate a preamble index.

Some examples of the method, apparatus, and non-transitory computer-readable medium described above may further include processes, features, means, or instructions for identifying configuration information that indicates whether one or multiple RA-RNTIs may be configured for one or more SSB, whether single or multiple random access response messages may be received based on the random access preamble, or any combination thereof. In some examples of the method, apparatus, and non-transitory computer-readable medium described above, the configuration information may be predetermined configuration information, may be received from the base station such as in a master information block (MIB), remaining minimum system information (RMSI), system information block (SIB), or a radio resource control (RRC) message, may be received from an upper layer, may be based on a capability of the UE, may be received from a different base station, may be periodically updated by a base station, or any combination thereof. In some examples of the method, apparatus, and non-transitory computer-readable medium described above, the different SSBs of the plurality of SSBs may have different configuration information. In some examples of the method, apparatus, and non-transitory computer-readable medium described above, the configuration information may be based on a number of actually transmitted SSBs.

A method of wireless communication is described. The method may include identifying a configuration for random access resources associated with one or more synchronization signal blocks (SSBs), a number of random access responses that are to be transmitted that are associated with one or more random access resources, and a random access radio network temporary identifier (RA-RNTI) for a control channel transmission associated with the number of random access responses, transmitting a plurality of SSBs to at least a first user equipment (UE), receiving a random access preamble from at least the first UE via a first random access resource, identifying one or more SSBs associated with the random access preamble based on the configuration of the random access resources and the first random access resource, generating one or more random access response messages based on the random access preamble, the one or more random access response messages including information for at least the first UE), where the RA-RNTI is determined based on one or more of the random access resources, the SSB, or an SSB index of the SSB, used for associated random access preambles from the one or more UEs, and transmitting the one or more random access response messages within a control channel that includes cyclic redundancy check bits scrambled by the RA-RNTI.

An apparatus for wireless communication is described. The apparatus may include means for identifying a configuration for random access resources associated with one or more synchronization signal blocks (SSBs), a number of random access responses that are to be transmitted that are associated with one or more random access resources, and a random access radio network temporary identifier (RA-RNTI) for a control channel transmission associated with the number of random access responses, means for transmitting a plurality of SSBs to at least a first user equipment (UE), means for receiving a random access preamble from at least the first UE via a first random access resource, means for identifying one or more SSBs associated with the random access preamble based on the configuration of the random access resources and the first random access resource, means for generating one or more random access response messages based on the random access preamble, the one or more random access response messages including information for at least the first UE, where the RA-RNTI is determined based on one or more of the random access resources, the SSB, or an SSB index of the SSB, used for associated random access preambles from the one or more UEs, and means for transmitting the one or more random access response messages within a control channel that includes cyclic redundancy check bits scrambled by the RA-RNTI.

Another apparatus for wireless communication is described. The apparatus may include a processor, memory in electronic communication with the processor, and instructions stored in the memory. The instructions may be operable to cause the processor to identify a configuration for random access resources associated with one or more synchronization signal blocks (SSBs), a number of random access responses that are to be transmitted that are associated with one or more random access resources, and a random access radio network temporary identifier (RA-RNTI) for a control channel transmission associated with the number of random access responses, transmit a plurality of SSBs to at least a first user equipment (UE), receive a random access preamble from at least the first UE via a first random access resource, identify one or more SSBs associated with the random access preamble based on the configuration of the random access resources and the first random access resource, generate one or more random access response messages based on the random access preamble, the one or more random access response messages including information for at least the first UE, where the RA-RNTI is determined based on one or more of the random access resources, the SSB, or an SSB index of the SSB, used for associated random access preambles from the one or more UEs, and transmit the one or more random access response messages within a control channel that includes cyclic redundancy check bits scrambled by the RA-RNTI.

A non-transitory computer-readable medium for wireless communication is described. The non-transitory computer-readable medium may include instructions operable to cause a processor to identify a configuration for random access resources associated with one or more synchronization signal blocks (SSBs), a number of random access responses that are to be transmitted that are associated with one or more random access resources, and a random access radio network temporary identifier (RA-RNTI) for a control channel transmission associated with the number of random access responses, transmit a plurality of SSBs to at least a first user equipment (UE), receive a random access preamble from at least the first UE via a first random access resource, identify one or more SSBs associated with the random access preamble based on the configuration of the random access resources and the first random access resource, generate one or more random access response messages based on the random access preamble, the one or more random access response messages including information for at least the first UE and having a corresponding control channel transmission addressed by a random access radio network temporary identifier (RA-RNTI), where the RA-RNTI is determined based on one or more of the random access resources, the SSB, or an SSB index of the SSB, used for associated random access preambles from the one or more UEs, and transmit the one or more random access response messages.

In some examples of the method, apparatus, and non-transitory computer-readable medium described above, multiple RA-RNTIs may be associated with the same random access resource and may be associated with one or more corresponding SSBs. In some examples of the method, apparatus, and non-transitory computer-readable medium described above, a single RA-RNTI may be associated with multiple random access resources and one or more of the SSBs may be associated with one or more random access resources. In some examples of the method, apparatus, and non-transitory computer-readable medium described above, a single random access response message, corresponding to a first random access resource, contains information for each UE that transmits a random access preamble within the first random access resource. In some examples of the method, apparatus, and non-transitory computer-readable medium described above, two or more random access responses may be transmitted, and each random access response may be for a different subset of a plurality of UEs.

In some examples of the method, apparatus, and non-transitory computer-readable medium described above, the first random access response message includes an indication of one or more preamble IDs, one or more SSs, one or more random access resources, or any combination thereof, for which the first random access response message may be carrying information. In some examples of the method, apparatus, and non-transitory computer-readable medium described above, the indication may include a flag, a bitmap identifying preambles, SSBs, random access resources, specific information for additional random access response messages, or any combination thereof.

In some examples of the method, apparatus, and non-transitory computer-readable medium described above, the configuration information may be predetermined configuration information, may be received from the base station such as in a MIB/RMSI/SIB/RRC message, may be received from an upper layer, may be based on a capability of the UE, may be received from a different base station, may be periodically updated by a base station, or any combination thereof. In some examples of the method, apparatus, and non-transitory computer-readable medium described above, the different SSBs of the plurality of SSBs may have different configuration information. In some examples of the method, apparatus, and non-transitory computer-readable medium described above, the configuration information may be based on a number of actually transmitted SSBs.

DETAILED DESCRIPTION

Figure 1:
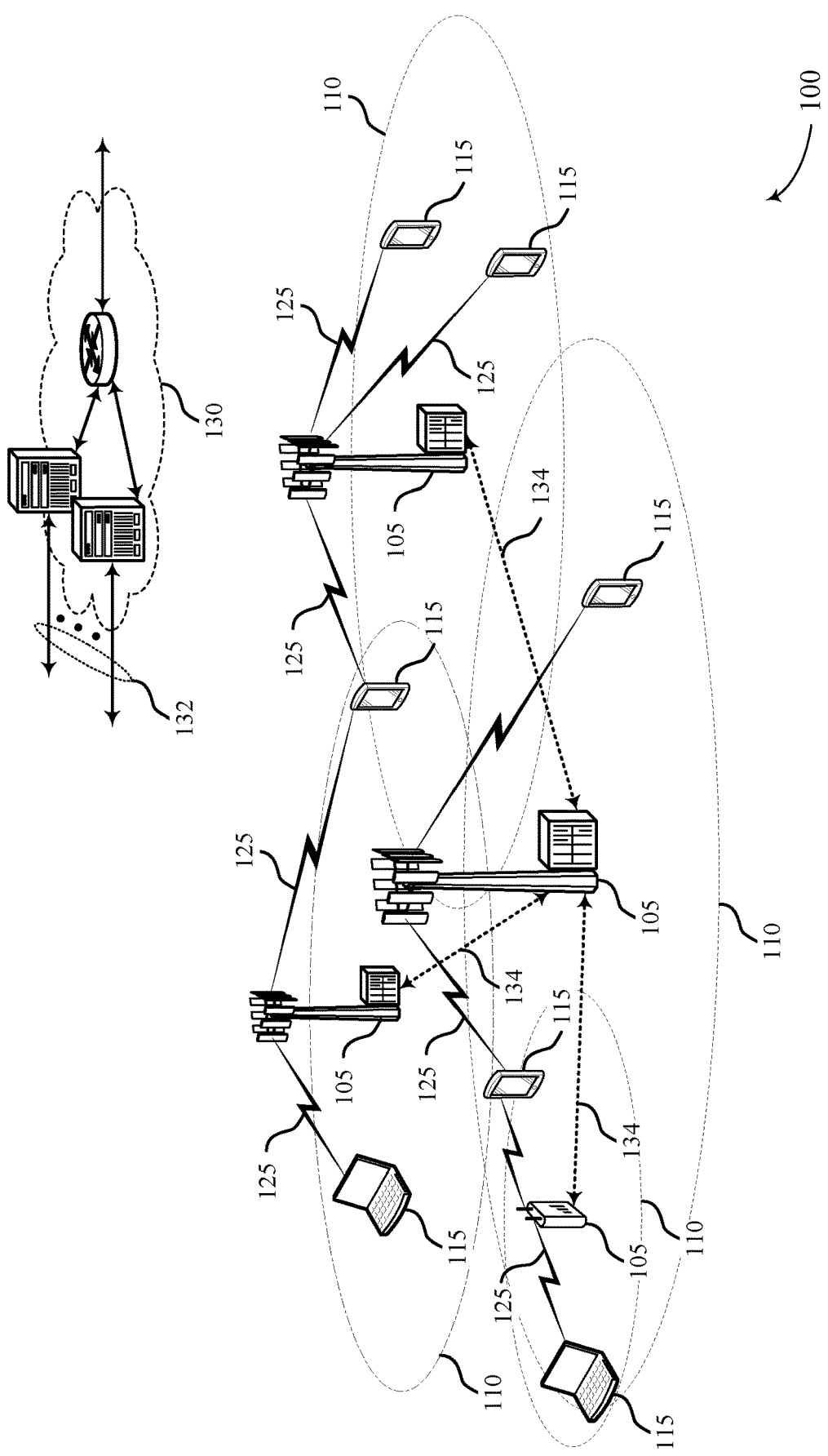
FIG. 1 illustrates an example of a system for wireless communication that supports random access response techniques based on synchronization signal block transmissions in accordance with aspects of the present disclosure.

Various described techniques provide for transmission of random access requests from a user equipment (UE) based on a synchronization signal that is received in a synchronization signal block (SSB) from a base station. In some cases, the SSB may be transmitted as part of a beam sweep procedure of the base station. In some cases, one or more SSBs may be mapped to one or more random access resources for initial access. For example, one SSB may be mapped to one random access resource, multiple SSBs may be mapped to one random access resource, one SSB may be mapped to multiple random access resources, and so forth. Since there are one or more SSBs that may be mapped to one or more random access resources, it may be helpful to define how to determine a random access radio network temporary identifier (RA-RNTI) associated with the SSBs or what information a random access response (RAR) message should carry. For example, multiple SSBs may correspond to multiple random access resources associated with a single or multiple RA-RNTIs. In some cases, the RA-RNTI may be determined based on random access resources used by the UE.

In some cases, a resource for transmission of the random access request (e.g., a random access preamble) may be determined based on the SSB. In these cases, since the SSBs are mapped to the resources for transmission of the random access preamble and the resources used for transmission of the random access preamble correspond to the RA-RNTI for the UE, the RA-RNTI then may be determined based on the selected SSB. Thus, a random access response may be transmitted from the base station based on a random access resource that is used for the random access preamble, an SSB associated with the random access resource, an SSB index, or combinations thereof. In some cases, two or more SSBs may be mapped to a single random access resource, and a single random access radio network temporary identifier (RA-RNTI) may be used for each of the two or more SSBs. In other cases, two or more RA-RNTIs may be used for different SSBs.

In some cases, a RAR may be configured to include an indication (e.g., a flag, a bit-map, or additional information) indicating to the UE whether a base station will respond to the UE and/or when a base station may respond to the UE. In such cases, based on the indication, the UE may not engage in or stop performing a blind search for its own RAR when the base station has determined not to respond to that UE, thereby reducing resource overhead, time, power consumption expended by the UE. In some cases, a single random access response message contains information for each UE that transmits a random access preamble in the single random access resource. In other cases, two or more random access response messages may contain information for different subsets of UEs that transmit random access preambles in the single random access resource.

In some examples, in mmW systems a base station and a UE may communicate via one or more directional beams, and a base station may engage in a beam sweeping operation to establish an active transmit beam with a UE. A base station and a UE may also engage in beam tracking to maintain a connection. In some cases, the base station, as part of the beam sweep procedure, may perform a sector sweep with wide-formed, lower gain beams to establish a primary connection. Then, the base station and the UE may perform beam refinement using narrower, higher gain beams, and the receiver may identify one or more transmit beams on which subsequent communications should be performed. In some cases, periodic beam management procedures may be used to transmit multiple beams having different beamforming parameters, and feedback may be provided for some or all of the different beams.

Aspects of the disclosure are initially described in the context of a wireless communications system. Aspects of the disclosure are further illustrated by and described with reference to apparatus diagrams, system diagrams, and flowcharts that relate to random access response techniques based on synchronization signal block transmissions.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

In some cases, a UE 115 may also be able to communicate directly with other UEs 115 (e.g., using a peer-to-peer (P2P) or device-to-device (D2D) protocol). In such cases, a first UE 115 may be a transmitter and another UE 115 may be a receiver. One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an Si or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, such as in the range of 300 MHz to 300 GHz. In some cases, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may use mmW communications between UEs 115 and base stations 105, which may use beamforming techniques for transmitting and receiving transmissions. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 105 or a UE 115) to shape and/or steer an overall antenna beam in the direction of a target receiver (e.g., a UE 115 or a base station 105). This may be achieved by combining elements in an antenna array in such a way that transmitted signals at particular angles experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and a UEs 115 may employ listen-before-talk (LBT) procedures to ensure a frequency channel is clear before transmitting data. In some cases, operations in unlicensed bands may be based on a carrier aggregation (CA) configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both. In some cases, mmW transmissions may use an unlicensed high frequency band and a separate anchor carrier may be established in a lower band.

As indicated above, some signals (e.g. synchronization signals, reference signals, beam selection signals, or other control signals) may be transmitted by a base station 105 or a UE 115 multiple times in different directions in a beam sweep operation, which may include a signal being transmitted according to different beamforming weight sets associated with different directions of transmission. Transmissions in different beam directions may be used to identify (e.g., by the base station 105 or a UE 115) a beam direction for subsequent transmission and/or reception, or for identifying a beam for inclusion in one or more active beam pairs. A receiving device (e.g., a UE 115 or base station 105) may try multiple receive beams when receiving various signals from the transmitting device in a beam sweep operation, such as synchronization signals, reference signals, beam selection signals, other control signals, or any combination thereof. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions). Feedback indicating one or more measured characteristics of some or all of the received beams may be transmitted according to various techniques as discussed herein.

In some cases, a UE 115, in order to establish a connection with a base station 105 may transmit a random access request (e.g., a random access preamble). In some systems, such as in an NR deployment, a mapping from SS blocks to random access channel (RACH) occasions may be defined, in which the RACH occasions may include a RACH transmission time/frequency resources that are to be used for a random access preamble, and possibly RACH preamble identification. A UE 115, based on a selected SS block (e.g., the strongest detected SS block from a beam sweep procedure, or an SS block with a reference signal received power (RSRP) greater than a threshold RSRP value), may choose a RACH resource and a preamble identification (ID) to transmit a RACH preamble (e.g., in a RACH message-1 transmission (Msg-1)).

In some cases, a UE 115 may receive a plurality of SSBs transmitted by a base station 105. The UE 115 may select a strongest SSB detected by the UE 115 and use the beam carrying the strongest SSB to transmit a random access preamble. Further, the SSB may be mapped to random access resources that the UE 115 may use to transmit a random access preamble, and the random access resources may correspond to a RA-RNTI for the UE 115. Thus, the UE 115 may identify the random access resources that the UE 115 may use for transmitting the random access preamble based on the SSB. In addition, the base station 105 may scramble cyclic redundancy check (CRC) bits with the RA-RNTI for the UE 115 and transmit within a control channel that includes control information for a RAR to the UE 115. As such, the UE 115 may monitor for the RAR based on the RA-RNTI received within the SSB. The UE 115 may then decode the control channel including the control information for the RAR based on the RA-RNTI.

For example, the UE 115 may descramble the CRC bits of the control channel using the RA-RNTI, and determine whether the descrambled CRC bits passes a CRC. If the CRC is successful, the UE 115 may process the control information received in the control channel that corresponds to the CRC bits. If the CRC is unsuccessful, the UE 115 may determine that the control information is not for the UE 115. Various aspects of the present disclosure provide techniques for assigning a random access radio network temporary identifier (RA-RNTI) and for transmitting random access responses based on one or more UEs 115 that transmit a random access preamble in a particular random access resource.

Figure 2:
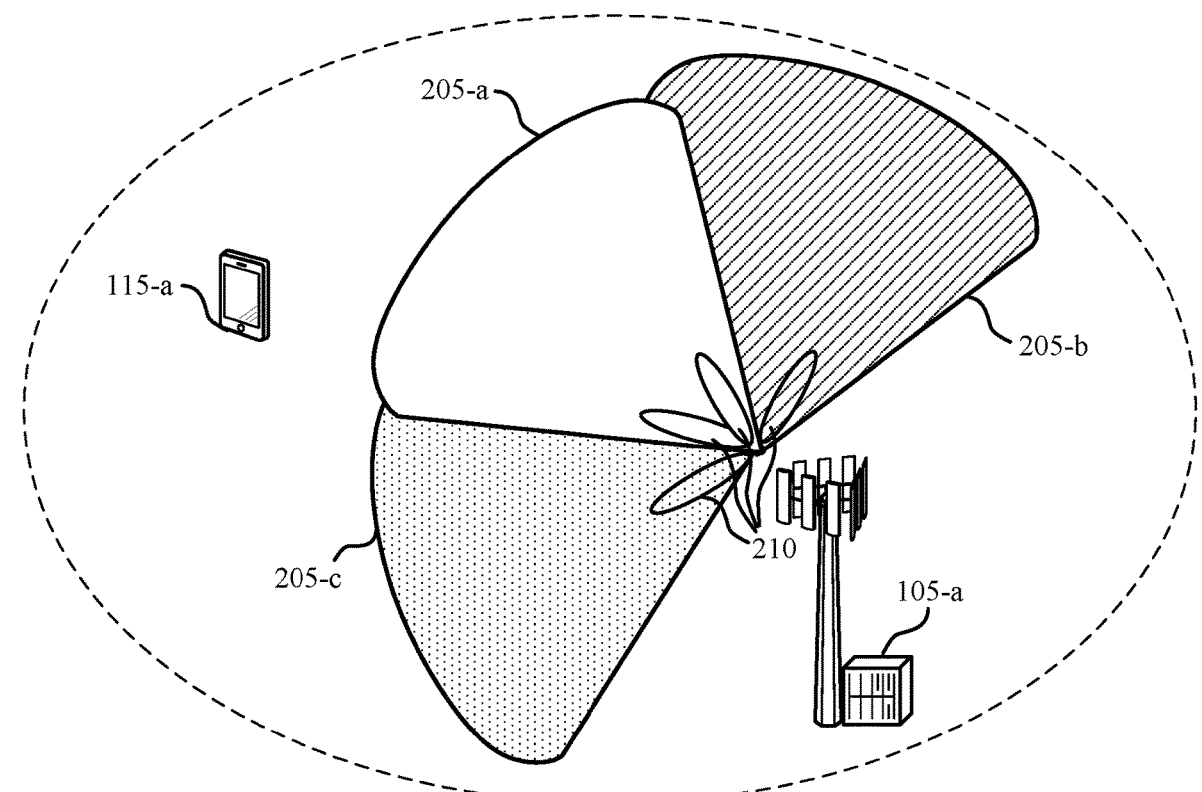
FIG. 2 illustrates an example of a wireless communications system that supports random access response techniques based on synchronization signal block transmissions in accordance with aspects of the present disclosure.

FIG. 2 illustrates an example of a wireless communication system 200 that supports random access response techniques based on synchronization signal block transmissions in accordance with various aspects of the present disclosure. Wireless communication system 200 may include a base station 105-*a* and a UE 115-*a*, which may be examples of the corresponding devices described with reference to FIG. 1. Base station 105-*a* and UE 115-*a* may communicate using one or more directional beams. In wireless communication system 200, a transmitter (e.g., base station 105-*a*) may engage in a beam sweeping operation to establish an active transmit beam with a receiver (e.g., UE 115-*a*), or a beam tracking to maintain a connection with the receiver (e.g., UE 115-*a*). While the example of FIG. 2 illustrates the base station 105-*a* as the transmitting device and the UE 115-*a* as the receiving device, it is to be understood that the UE 115-*a* may be the transmitting device and the base station 105-*a* may be the receiving device in other examples, and techniques as discussed herein may be applied to any transmitting device or receiving device.

In some examples, base station 105-*a* may engage in a beam sweeping operation to establish an active transmit beam with UE 115-*a*. In some examples, base station 105-*a* may also engage in a beam tracking procedure to maintain a connection with UE 115-*a*. Additionally or alternatively, base station 105-*a* may transmit multiple beam refinement signals. For example, base station 105-*a* may use a first antenna port to transmit a relatively wide-formed beams 205 (e.g., analog beams), that may be transmitted towards different sectors or geographic directions. In the example of FIG. 2, a first wide-formed beam 205-*a* may be transmitted in a first direction, a second wide-formed beam 205-*b* may be transmitted in a second direction, and a third wide-formed beam 205-*c* may be transmitted in a third direction. In some examples, gain across a plurality of tones corresponding to wide-formed beams 205 may be close to equal. In some cases, each of the wide-formed beams 205 may be used to transmit an associated an SSB.

In some cases, wide-formed beams 205 may not be narrow enough or have a high enough gain to be a preferred directional transmit beam. Transmissions from base station 105-*a* may be more clearly received and decoded if transmitted via a highly directional and refined transmit beam. Therefore, it may be beneficial for base station 105-*a* and UE 115-*a* to use a beam refinement process to generate narrower beamformed signals of refined beams 210, which may have a narrower coverage area but a higher gain than the wide-formed beams 205, and which may be identified by a particular index value. UE 115-*a* may identify which of the received beams 205 and 210, or combinations thereof, is received at the highest gain or with a gain that is above a threshold value, and the UE 115-*a* may transmit a random access preamble using random access resources that are identified based on the measured gains.

As indicated, the UE 115-*a* may measure one or more performance metrics for each of transmission beams 205 and 210. For example, the UE 115-*a* may measure an RSRP and a channel quality indicator (CQI) for each received beam. Each of the beams 205 and 210 may have an associated beam index, which may be used for beam identification. In some cases, each of the beams 205 and 210 may include one or more of a beam index, a number of beams to be reported in a feedback report or in a random access preamble. While the example of FIG. 2 shows that SS blocks may be transmitted using different beamformed transmissions, base stations 105 of other examples may transmit SS blocks that are not part of a beam sweeping procedure, such as base stations 105 that transmit using sub-6 GHz transmissions, for example. In such cases, different SS blocks may be associated with particular random access resources that UE 115-*a* may use for transmission of a random access preamble. Furthermore, while various examples described herein illustrate base station (e.g., gNB, eNB, etc.) to UE communications, the techniques described herein may also be used for UE-to-UE links, or base station to base station links (such as in wireless backhaul between base stations, between a base station and a relay, or between wireless backhaul relays, for example).

Figure 3:
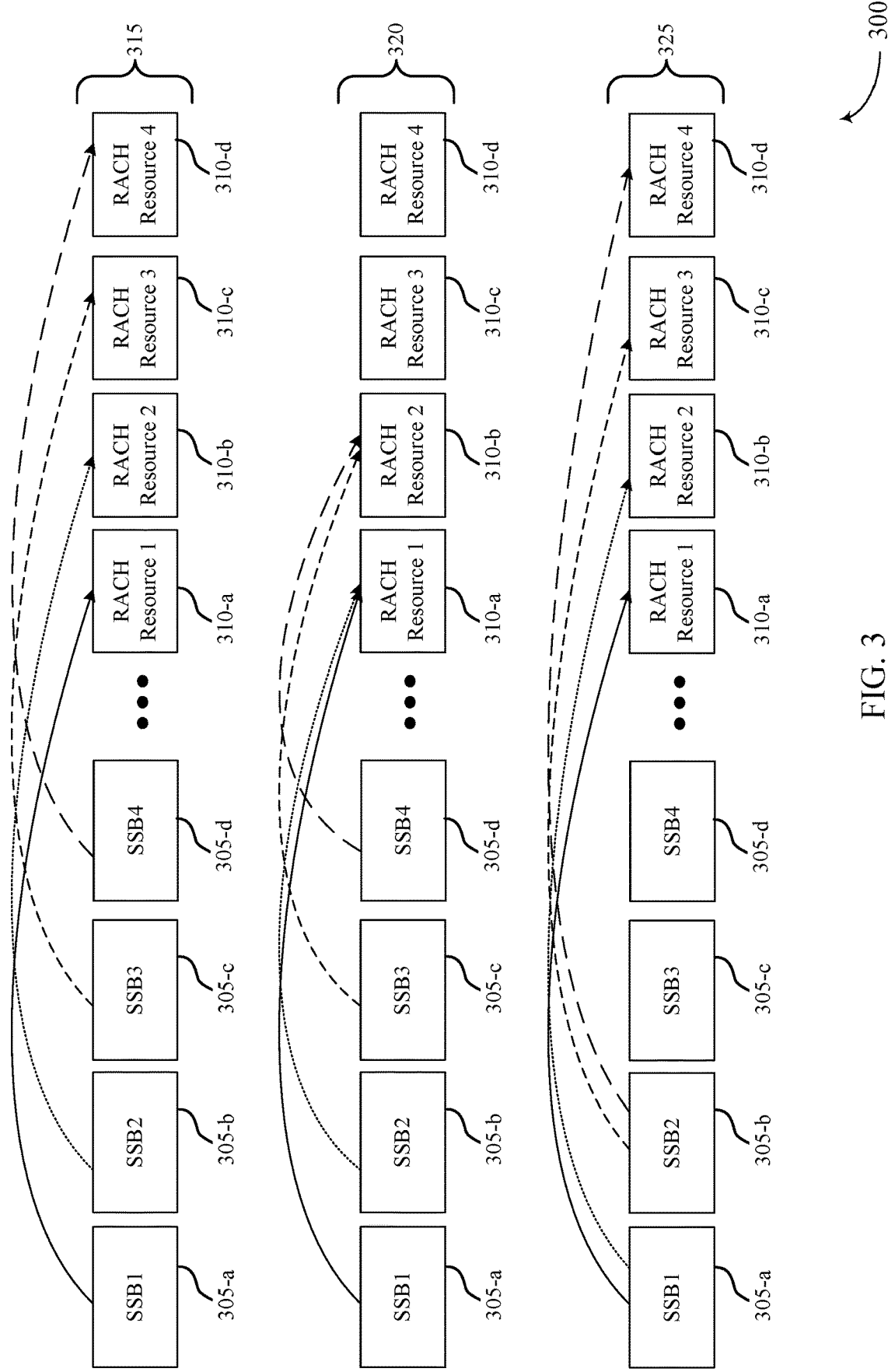
FIG. 3 illustrates an example of synchronization signal blocks and random access resource mappings that support random access response techniques based on synchronization signal block transmissions in accordance with aspects of the present disclosure.

FIG. 3 illustrates an example of mappings 300 between SSBs and RACH resources that support random access response techniques based on synchronization signal block transmissions in accordance with various aspects of the present disclosure. In some examples, mappings 300 may be used to implement aspects of wireless communication system 100.

Mapping from SS blocks to RACH transmission time/frequency resources may, in some cases, be performed based on a first mapping alternative 315 in which a one-to-one mapping between SSBs 305 and RACH resources 310 is provided. In this example, SSB1 305-*a* is mapped to RACH resource 1 310-*a*, SSB2 305-*b* is mapped to RACH resource 2 310-*b*, SSB3 305-*c* is mapped to RACH resource 3 310-*c*, and SSB4 305-*d* is mapped to RACH resource 4 310-*d*.

A second mapping alternative 320 may have a many-to-one mapping, in which two or more SSBs 305 may be mapped to a single RACH resource 310. In this example, SSB1 305-*a* and SSB2 305-*b* are both mapped to RACH resource 1 310-*a*, and SSB3 305-*c* and SSB4 305-*d* are both mapped to RACH resource 2 310-*b*.

A third mapping alternative 325 may have a one-to-many mapping, in which each SSB 305 may be mapped to two or more RACH resources 310. In this example, SSB1 305-*a* is mapped to RACH resource 1 310-*a* and RACH resource 2 310-*b*, and SSB2 is mapped to RACH resource 3 310-*c* and RACH resource 4 310-*d*.

In the first mapping alternative 315 and second mapping alternative 320, the RACH transmission occasion may be confined to one time/frequency region based on the selected SS block 305. In the third mapping alternative 325, the UE may have a flexibility to select one time/frequency region from multiple time/frequency regions based on the selected SS block 305.

While the examples of FIG. 3 illustrate that each SS block 305 uses a same mapping alternative, in some cases different SS blocks 305 may use different mapping alternatives. For example, SSB1 305-*a* may be mapped to two RACH resources, such as RACH resource 1 310-*a* and RACH resource 2 310-*b*, SSB2 305-*b* may be mapped to a single RACH resource such as RACH resource 3 310-*c*. In such an example, SSB3 305-*c* and SSB4 305-*d* may be both mapped to a single RACH resource, such as RACH resource 4 310-*d*. Of course, numerous other alternatives with mixed mapping alternatives may be used, and the examples provided herein are for purposes of illustration and discussion. In some cases, a base station 105 may select a mapping alternative, or a mixture of mapping alternatives, for use in communications with the base station 105 based on one or more factors (e.g., a number of SSBs transmitted by the base station 105, a number of UEs 115 expected to transmit random access preambles, channel conditions of one or more of the SSB or RACH resources, etc.).

In some cases, such as in many-to-one mapping alternative 320, a UE 115 may determine a RACH preamble ID based on the SS block index, and the random access preamble may include the determined RACH preamble ID. In this case, the base station 105, upon reception of a RACH preamble, may determine the selected SS block by the UE 115. Additionally or alternatively, a mmW base station 105 may be able to determine what SS block a transmitted RACH preamble is corresponding to, based on digital beamforming and beam correspondence to obtain TX beam (of the SS block) based on the detected RACH preamble. A RACH response (RAR) is transmitted by a base station 105 (e.g., eNB or gNB) through a scheduled downlink shared channel (DL-SCH) along with a corresponding PDCCH channel. In LTE, a RAR message contains the preamble ID of the UE 115 the base station 105 is sending the RAR to, corresponding timing advance (TA) command, grant for message-3 (Msg-3), and a temporary ID (TC-RNTI). A RAR message may contain a backoff indicator in some cases. In some cases, a base station 105 may combine the information for multiple UEs 115 (e.g., preamble IDs) inside a single RAR message.

Corresponding to each RAR message, there is a RA-RNTI ID that is addressed by PDCCH. The RA-RNTI may be determined based on the time/frequency resources used for the transmission of the RACH preamble. For example, all UEs 115 transmitting a RACH preamble on the same resource may have the same RA-RNTI and may be addressed by the same PDCCH. In some cases, base station 105 may scramble cyclic redundancy check bits for the PDCCH with the RA-RNTI, to enable the UE 115 to determine whether the PDCCH includes control information for the UE 115.

The present disclosure provides various designs for transmission of a random access response, considering different possible mappings of SS blocks to RACH occasions including a many-to-one mapping, any other mapping alternative, or any combination of mapping alternatives.

In some cases, SS blocks 305 may be transmitted with different analog and/or digital beamforming (BF) (e.g. towards different directions). Correspondingly, RACH preambles should be received through different analog and/or digital beamforming (e.g. from different directions). Using the many-to-one mapping alternative 320 as an example, where multiple SSBs 305 are mapped to a single RACH time/frequency resource 310, a base station 105 may receive a RACH preamble from multiple UEs 115 on the same RACH resource (that are potentially corresponding to different SSBs, different BF configurations, or combinations thereof). In such cases, the base station 105 may want to transmit a RAR to one or more of the multiple UEs 115, and thus, may select a corresponding RA-RNTI and RAR message content for the one or more UEs 115. Various aspects of the disclosure provide techniques for transmitting a RAR to one or multiple of these UEs, including the selection of a RA-RNTI and a RAR message content.

In some cases, a RA-RNTI may be determined based on a RACH time/frequency resource 305, similarly as in LTE. In such cases, multiple SS blocks may be mapped to a single RA-RNTI in a many-to-one mapping alternative. Also, a single SS block may be mapped to multiple RA-RNTIs in a one-to-many mapping alternative. In other cases, the RA-RNTI may be additionally or alternatively determined based on the corresponding SS block index (or resources) of the SS block 305. For example, in a case where two SS blocks 305 (e.g., SSBi and SSBj) are mapped to the same RACH time/frequency resource 310, there may be two RA-RNTI (e.g., ID_i and ID_j) for the same RACH resource 310 and corresponding to the two SS blocks 305. In such cases, multiple SS blocks 305 may still be mapped to a same RA-RNTI. For example, a first set of SS blocks may be mapped to ID_1, and the second set of SS blocks may be mapped to ID_2. It is to be noted that various examples discuss the many-to-one SS block to RACH occasion mapping, although the techniques provided herein can be applied to other cases as well, and may also be applied when mixed mappings are used. However, for the case of one-to-many mapping RA-RNTI, such an alternative may support another example (e.g. multiple RACH occasions having the same RA-RNTI). In this example, multiple RACH resources may be identified by the same RA-RNTI, and the RA-RNTI may be determined by the SS block 305 that was mapped to multiple RACH occasions 310. In some cases, the RA-RNTI may be determined by an SS block identification of the SS block 305 that was mapped to multiple RACH occasions 310.

For the random access response (RAR) message, a single RAR message may contain information for all the target UEs 115 (identified at this stage by, e.g., preamble ID, a RACH resource and/or an SS block index)) to which the base station 105 wants to send a response via a RAR message. In other cases, a RAR message may contain information for a subset of target UEs 115 to which the base station 105 wants to send a response. In such cases, multiple RAR messages may need to be transmitted to respond all the selected UEs 115. For example, there may be a RAR message corresponding to each SS block 305 (addressing potentially multiple UEs 115 based on multiple detected preamble IDs). In another example, multiple (e.g., having different content) RAR messages can be transmitted in different directions (corresponding to different SS block directions). In both above alternatives, the same RAR message may be transmitted multiple times, in order to increase the chance of successful reception by the target UEs 115. For example, a single RAR message may be transmitted multiple times with same or different digital and/or analog beamforming (e.g. towards different directions). Similarly, in the second alternative, a RAR message targeting one or a subset of UEs 115 may be transmitted multiple times (e.g. with the same or different BF configuration). Note that a UE, after sending a RACH preamble, may monitor a set of resources within a configured RAR window for the RACH response. This involves searching for a PDCCH with the given RA-RNTI (e.g., searching for a PDCCH having cyclic redundancy check bits scrambled by the RA-RNTI), and in case of receiving such PDCCH, the UE 115 may try to receive and decode the corresponding RAR message (transmitted in a PDSCH).

In some cases, the random access response message for a given RA-RNTI does not always contain or address all of the preamble IDs transmitted on the corresponding RACH resource. In such cases, a UE 115 may decode the random access response message and realize it is not responded to. Further, in some cases, a UE 115 may be able to successfully receive and decode a PDCCH of a given RA-RNTI, but fail to successfully receive and decode the corresponding PDSCH—for example, because the PDCCH may require a lower link budget (SNR) for successful decoding. In these cases, each decoding and/or channel processing that the UE 115 undertakes may increase time, resources, and power consumption for the UE 115. Thus, the present disclosures include multiple variations of RA-RNTI and RAR message configurations that may reduce the time, resources and power consumption expended by the UE 115.

In some examples, multiple variants may be configured for generating RA-RNTIs and random access response messages, and one or multiple of the variants may be selected or configured by a base station 105 for communications with UEs 115. In some cases, the selection may be configured or indicated in system information provided in an SS block (e.g., via a master information block (MIB) transmitted in physical broadcast channel (PBCH)) or transmitted separately from SS blocks (e.g., via a remaining minimum system information (RMSI) in a scheduled PDSCH).

In one example, a single RA-RNTI may be used for all SSBs mapped to the same RACH resource, and a single RAR message may contain information for all of the target UEs 115. In some cases, if a random access response is to be transmitted multiple times, the base station 105 may incur a relatively large resource overhead, and also the UE 115 may be able to successfully receive one or multiple PDCCHs (addressing its RA-RNTI of the UE 115), and thus, attempt to receive the corresponding random access response messages, but fail to successfully decode a corresponding PDSCH. In some cases, an ordering mechanism of multiple PDCCHs may be provided for a same RA-RNTI. For example, a UE 115 may receive multiple PDCCHs (for the same RA-RNTI), and hence have multiple hypotheses to receive a PDSCH. Such a UE, in some examples, may order PDSCH hypotheses based on at least one quality metric (e.g., reference signal received power (RSRP), reference signal received quality (RSRQ), or other channel quality metric) and schedule processing of the different hypotheses at least based on this order. As soon as the UE 115 can successfully decode a random access response message, the UE 115 may stop processing the remaining random access response message hypotheses (or it may have to continue processing if the UE 115 was not addressed in this random access response). The quality metric can be defined based on the corresponding received PDCCH (e.g., RSRP, RSRQ, etc.).

In other examples, a single RA-RNTI may be used for all SSBs mapped to the same RACH resource, and potentially multiple RAR messages having different content may be used to respond to all of the target UEs 115. Similar to the first alternative, a UE 115 may be able to successfully receive and/or decode multiple PDCCHs, and hence have multiple hypotheses for receiving a PDSCH. Thus, even if the UE 115 can successfully decode a PDSCH (in which a RAR message is transmitted) there is no guarantee the UE is addressed/responded in this RAR message. Hence, the UE 115 may still need to go through processing of all PDSCH hypotheses until either the UE 115 successfully receives a RAR message containing its preamble ID, or reaches the end of a configured RAR window.

In some cases, a RAR message may include information, in addition to the preamble IDs, about the SS blocks (e.g., within the set of corresponding SS blocks to the RA-RNTI) that the RAR message corresponds to. Alternatively, if multiple RACH resources are mapped to the same RA-RNTI (e.g., in a one-to-many mapping), RAR message may indicate the RACH resources (e.g., within the corresponding set of RACH resources) along with the preamble IDs to which the RAR message is responding. Thus, a RAR message, for a given RA-RNTI, may contain information for only a subset of target UEs 115, and hence multiple RAR messages (with different content) may be transmitted for a given RA-RNTI. In some cases, a RAR message may contain some indication for UEs 115 with other preamble IDs, SSBs, or RACH resources that are not addressed in the RAR message, that those other UEs 115 may or may not be addressed in one or more separate RAR message(s) (e.g., in the same RAR window). This indication may be, for example, a flag (e.g., a 1-bit flag) indicating other RAR message(s) may be transmitted addressing another set of preamble IDs, SSBs, or RACH resources (corresponding to the same RA-RNTI). In some cases, the indication may include a bit-map identifying individual preambles, a set of preambles, SSBs, or RACH resources (or different subsets thereof), for which other or additional RAR message(s) are to be transmitted. In some cases, the set of preambles identified by a bit-map may be divided into a number of subsets of preambles so as to reduce overhead of the bit-map. In some cases, more information (e.g., indicating the resources or portions thereof of PDCCH and/or PDSCH of the additional RAR messages) may also be provided to help the UEs 115 with processing of such additional RAR messages. In some cases, the indication may include a RACH preamble index including configuration information for one or more different RAR messages. In such cases, content and/or configuration of a RAR payload may be different based on the RACH preamble index. For example, where a preamble index includes 64 preambles, each having a specific preamble ID, 50 of the 64 preambles may correspond to one type of content and/or configuration of a RAR payload and the 14 remaining preambles may correspond to another type of content and/or configuration of a RAR payload.

In another alternative, multiple RA-RNTIs may be provided for a single RACH time/resource configuration (e.g., mapped to multiple (sets of) SS blocks), and each RAR message may contain information for all the targeted UEs 115. Such an alternative may generally lead to more resource overhead. However, a UE 115 (e.g., based on its capabilities) may attempt to receive and process different RAR messages, and corresponding PDCCH, for the RA-RNTIs corresponding to the RACH time/frequency resources the UE 115 used for its RACH preamble transmission. For example, in addition to searching for its own RA-RNTI, a UE 115 may search for other RA-RNTIs that correspond to the same RACH time/frequency resources the UE has used for the RACH preamble transmission. In such cases, the UE 115 may decode the RAR message sooner since the RAR message contains information for all of the targeted UEs 115.

In still a further alternative, multiple RA-RNTIs may be provided for a single RACH time/resource configuration (e.g., mapped to multiple SS blocks or multiple sets of SS blocks), and potentially multiple RAR messages may be transmitted to respond to all target UEs 115. For example, an SS block-specific or a beam-specific random access response PDCCH/PDSCH transmission may be transmitted. In such cases, each of SS blocks may have its own RA-RNTI and RAR message.

Thus, in some examples, four or more different variants may be provided for RA-RNTIs and for information contained in random access response messages. In some cases, a selected variant may be predetermined. In some cases, a base station 105 may indicate which of the specified variants is adopted via, for example, a master information block (MIB), remaining master system information (RMSI), system information block (SIB), radio resource control (RRC) message, or combinations thereof. In some cases, an indication can alternatively or additionally come from upper layers; be preconfigured for a UE 115 (or a set of UEs 115); be configured for different categories of UEs 115; be configured based on a capability of a UE 115; or any combinations thereof. In some cases, a base station 105 may transmit a configuration for one or more neighbor base stations 105, one or more base stations 105 operating at a different frequency and/or RAT (e.g., for the case of LTE-NR coexistence, or NR sub6 GHz-above6 GHz coexistence), or combinations thereof. In some cases, different SS blocks (or sets of SS blocks) and corresponding RACH resources may have different configurations (i.e., different variants for different SS block/RACH resources). In some cases, configurations may change over time and signaling may be provided to the UEs 115 (e.g., through a radio resource control (RRC) signaling or a system information block (SIB) to acquire a new configuration.

In some cases, the RA-RNTI, RAR payload, or combinations thereof may depend on actually transmitted SS blocks. For example, there may be 64 SS blocks in a 20 msec synchronization period, and a RAR/RA-RNTI baseline configuration may be determined accordingly. In some cases, a base station 105 may actually use only a subset (e.g., 20 SS blocks) of the total number of available SS blocks (e.g., 64 SS blocks). In such cases, the base station 105 may select mappings between SS blocks and RACH resources, RA-RNTIs, and RAR payloads based on the actually transmitted 20 SS blocks such that the mappings may provide a more efficient use of network resources.

In some examples, at least time and frequency may be considered in the calculation of a RA-RNTI. Additionally, each SSB set in a wireless communications system may contain multiple SSBs 305 and one RACH transmission occasion (RO) may be associated with multiple SSBs 305. For instance, a transmission of SSBs 305 within an SS burst set may be confined to a specific window (e.g., a 5 ms window) regardless of an SS burst set periodicity. Within this window, there may be a number of possible candidate locations for SSBs 305 (represented by L). In such cases, a maximum number of SSBs 305 within an SS burst set, L, for different frequency ranges may be, for example, L=4, for a frequency range up to 3 GHz; L=8 for a frequency range between 3 GHz and 6 GHz; L=64 for a frequency range between 6 GHz and 52.6 GHz. A minimum number of SSBs 305 transmitted within each SS burst set may be one to define performance requirements. In some cases, if multiple SSBs are mapped to one RO, at least a mapping from different SSBs to non-overlapping subsets of RACH preamble indices within one RO may be supported.

Additionally, each slot and subcarrier region within a system may include multiple ROs because multiple ROs (e.g., short ROs) may fit into a single slot. For instance, one PRACH format may be configured for a cell, where PRACH formats based on a short sequence length (e.g., a length of PRACH preamble is 139), there may be different formats (e.g., format A, format B, or format C, each format including different subformats (e.g., format A including format A1, A2, and A3, format B including format B1, B2, B3, and B4, or format C including format C0 and C2, etc.) for configuring the cell. In such cases, different formats (e.g., format A and format B) may be considered as a package for the PRACH configuration, and thus, either format A/B or format C may be configured for the cell. Additionally, if format A/B is configured, a last PRACH resource within a RACH slot may use the format B and other PRACH resources within the RACH slot may use format A. In some cases, there may be support for a subformat (e.g., format B4) within a RACH slot, such as in the case of a single PRACH occasion, or there may be support for a PRACH format taken from subformat A0, A1, A2, or A3 within the RACH slot.

In some cases, there may be a dependency of RA-RNTI on time. For example, a RA-RNTI calculation may include at least index of RACH transmission occasion, instead of symbol and slot index. For instance, a time location of a transmission (e.g., a transmission of Msg1) may be a function of subframe index, slot index within a subframe, and symbol index within a slot. As a result, in one option, RA-RNTI may be a function of subframe, slot, and symbol index. The number of possible RACH transmission occasions within a sub-frame may be less than the number of symbols within a subframe. Thus, the time location of Msg1 within a subframe may be identified as a RACH transmission (RO) index within the subframe. Some wireless systems may accordingly support conveying an RO index, instead of symbol and slot index, through the combination of RA-RNTI and RAR.

Additionally or alternatively, there may be a dependency of RA-RNTI on an uplink index. That is, the RA-RNTI calculation may include at least an uplink index in a cell configured with supplemental uplink (SUL). For example, in a cell configured with an SUL, UEs 115 may perform RACH procedures on either uplink carrier (e.g., UL and SUL). As a result, it may be necessary to include an uplink index in the calculation of the RA-RNTI calculation. Otherwise, if two UEs 115 happen to transmit on different uplinks but in the same RO using the same preamble, they may have the same RA-RNTI. Such scenarios may lead to a collision when the UEs 115 transmit, for example, Msg3 based on the same uplink grant given in the same Msg2.

In some examples, the combination of an RO and RACH preamble index may be conveyed to a UE 115 through different combinations of a RA-RNTI and a RAR payload. As a result, there may be different cases of this, including a first case where the RA-RNTI is a function of RO index but not a function of an SSB index, and a second case where the RA-RNTI is a function of both an SSB index and an RO index.

In cases where multiple SSBs 305 are mapped to one RO (or one RACH resource 310) (such as described above with reference to second mapping alternative 320), if the RA-RNTI is a function of both an SSB index and an RO index, the RAR may correspond to only one SSB 305. On the other hand, in cases where the RA-RNTI is a function of RO index but not SSB index, RAR may correspond to multiple SSBs 305 mapped to the same RO.

In such cases, if the RA-RNTI is a function of both SSB index and RO index, a UE 115 that selected, for example, SSB1 305-a, may only receive a RAR grant corresponding to its own SSB 305. That is, the UE 115 may not receive the RAR grant corresponding to another SSB 305 (e.g., SSB2 305-b) (such as in cases where a base station 105 may not be able to transmit the RAR corresponding to multiple SSBs simultaneously). Alternatively, RA-RNTI may be a function of RO index but not a function of the SSB index. In that alternative, the base station 105 may have the flexibility to transmit RAR corresponding to multiple SSBs 305 simultaneously. However, a UE 115 that selected, for example, SSB1 305-a to send a random access transmission (e.g., a transmission of Msg 1) may receive the RAR grant corresponding to SSB2 305-b, which may incur additional complexity.

As a result, making the RA-RNTI dependent on both RO and SSB index may reduce base station flexibility in cases where a base station 105 may not be able to transmit RARs corresponding to multiple SSBs 305 with one RAR grant. Additionally, making the RA-RNTI dependent on both RO and SSB index may reduce UE complexity since a UE 115 may not need to decode a RAR grant corresponding to an SSB index that the UE 115 did not select for a transmission (e.g., the transmission of Msg 1).

In some cases, if multiple SSB(s) 305 are mapped to one RACH transmission occasion, there may be scenarios where the SSB(s) 305 are mapped to non-overlapping subsets of preamble indices. For example, if multiple SSBs 305 are mapped to one RO, there may be a mapping from different SSBs 305 to non-overlapping subsets of RACH preamble indices within the one RO. In some cases, if a RAR payload denotes a preamble index within the RO, then making RA-RNTI a function of both RO and SSB index may generate some redundant information between the RA-RNTI and the RAR payload. Additionally, if one SSB is mapped to multiple ROs or only one SSB 305 is mapped to one RO, then the RO index itself may implicitly convey the SSB index. Making RA-RNTI as a function of both SSB and RO index may generate redundancy between RA-RNTI and RAR payload.

A RA-RNTI may be determined based on an SSB index of multiple SSBs 305 that are mapped to one RACH resource 310. The SSB index may be a relative SSB index among the multiple SSBs 305 that are mapped to the single RACH resource 310. As an illustrative example, there may be 64 SSBs 305 and 16 RACH resources 310, and 4 SSBs may be mapped to one RACH transmission occasion (or to one RACH resource 310). Accordingly, a first set of SSBs 305 (e.g., SSBs 1 through 4) may be mapped to a first RACH resource 310 (e.g., RACH resource 1 310-a), a second set of SSBs 305 (e.g., SSBs 5 through 8) may be mapped to a second RACH resource (e.g., RACH resource 2 310-b), and so on. In some cases, a RA-RNTI corresponding to SSB6 may be determined from RACH resource index number 2 and relative SSB index number 2 (e.g., since four SSBs 305 were mapped to RACH resource 2 310-b and SSB6 is the second relative SSB 305 among these four SSBs 305). Additionally or alternatively, a RA-RNTI may not depend on (or may be independent from) an SSB index if only one SSB 305 is mapped to a single RACH resource 310.

Figure 4:
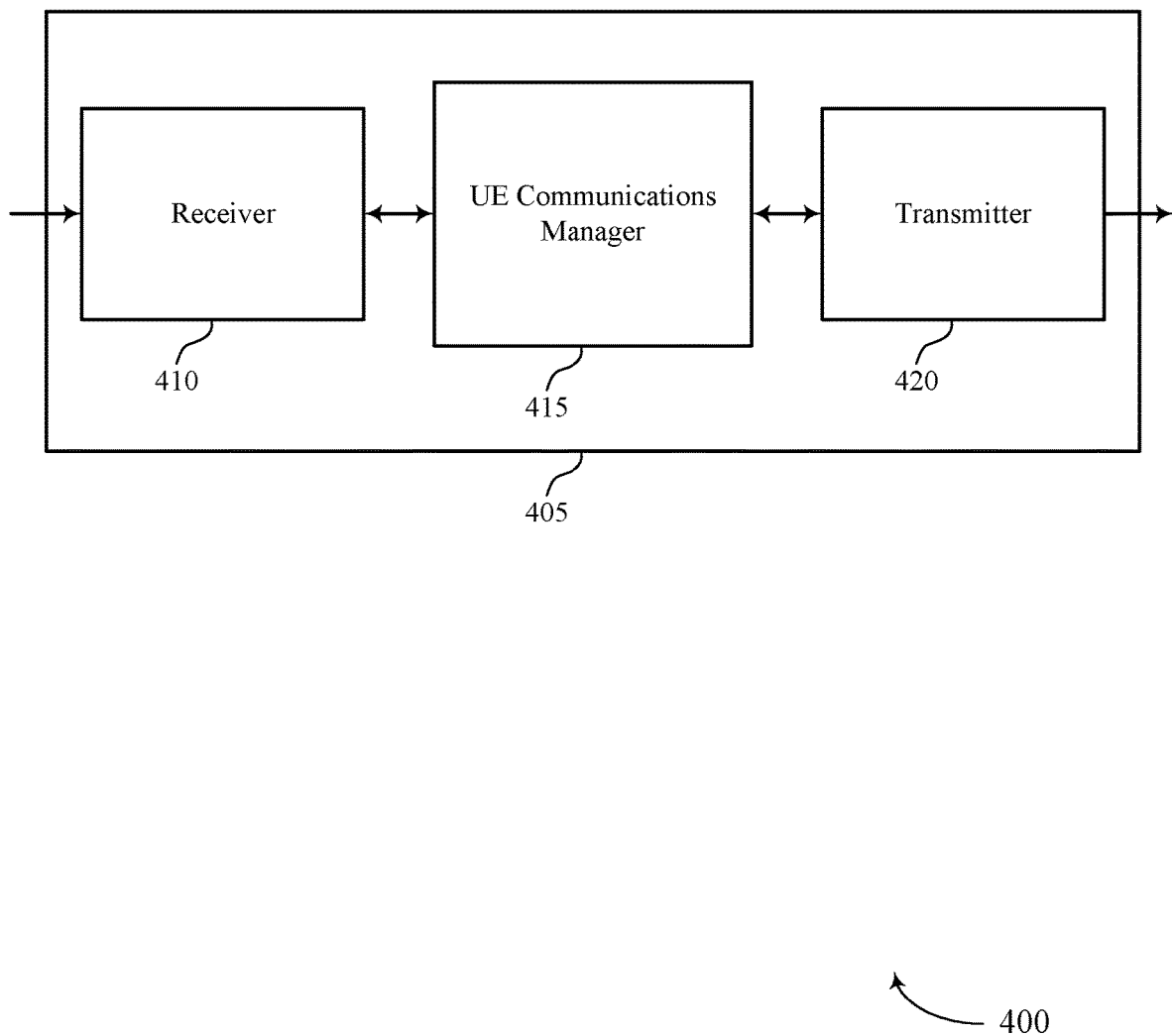
FIGS. 4 through 6 show block diagrams of a device that supports random access response techniques based on synchronization signal block transmissions in accordance with aspects of the present disclosure.

FIG. 4 shows a block diagram 400 of a wireless device 405 that supports random access response techniques based on synchronization signal block transmissions in accordance with aspects of the present disclosure. Wireless device 405 may be an example of aspects of a user equipment (UE) 115 as described herein. Wireless device 405 may include receiver 410, UE communications manager 415, and transmitter 420. Wireless device 405 may also include a processor. Each of these components may be in communication with one another (e.g., via one or more buses).

Receiver 410 may receive information such as packets, user data, or control information associated with various information channels (e.g., control channels, data channels, and information related to random access response techniques based on synchronization signal block transmissions, etc.). Information may be passed on to other components of the device 405. Receiver 410 may be an example of aspects of transceiver 735 described with reference to FIG. 7. Receiver 410 may utilize a single antenna or a set of antennas.

UE communications manager 415 may be an example of aspects of UE communications manager 715 described with reference to FIG. 7.

UE communications manager 415 and/or at least some of its various sub-components may be implemented in hardware, software executed by a processor, firmware, or any combination thereof. If implemented in software executed by a processor, the functions of UE communications manager 415 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. UE communications manager 415 and/or at least some of its various sub-components may be physically located at various positions, including being distributed such that portions of functions are implemented at different physical locations by one or more physical devices. In some examples, UE communications manager 415 and/or at least some of its various sub-components may be a separate and distinct component in accordance with various aspects of the present disclosure. In other examples, UE communications manager 415 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 415 may receive a synchronization signal block (SSB) of a set of SSBs transmitted by a base station 105, identify random access resources for transmitting a random access preamble based on the received SSB, transmit the random access preamble to the base station 105 using the random access resources, monitor for a random access response from the base station 105 within a control channel that includes cyclic redundancy check bits scrambled by a random access radio network temporary identifier (RA-RNTI), the random access response including information for one or more UEs 115, determine the RA-RNTI for the UE 115 based on one or more of the identified random access resources, the SSB, or an SSB index of the SSB, and decode the control channel based on the RA-RNTI.

Transmitter 420 may transmit signals generated by other components of the device 405. In some examples, transmitter 420 may be collocated with receiver 410 in a transceiver module. For example, transmitter 420 may be an example of aspects of transceiver 735 described with reference to FIG. 7. Transmitter 420 may utilize a single antenna or a set of antennas.

Figure 5:
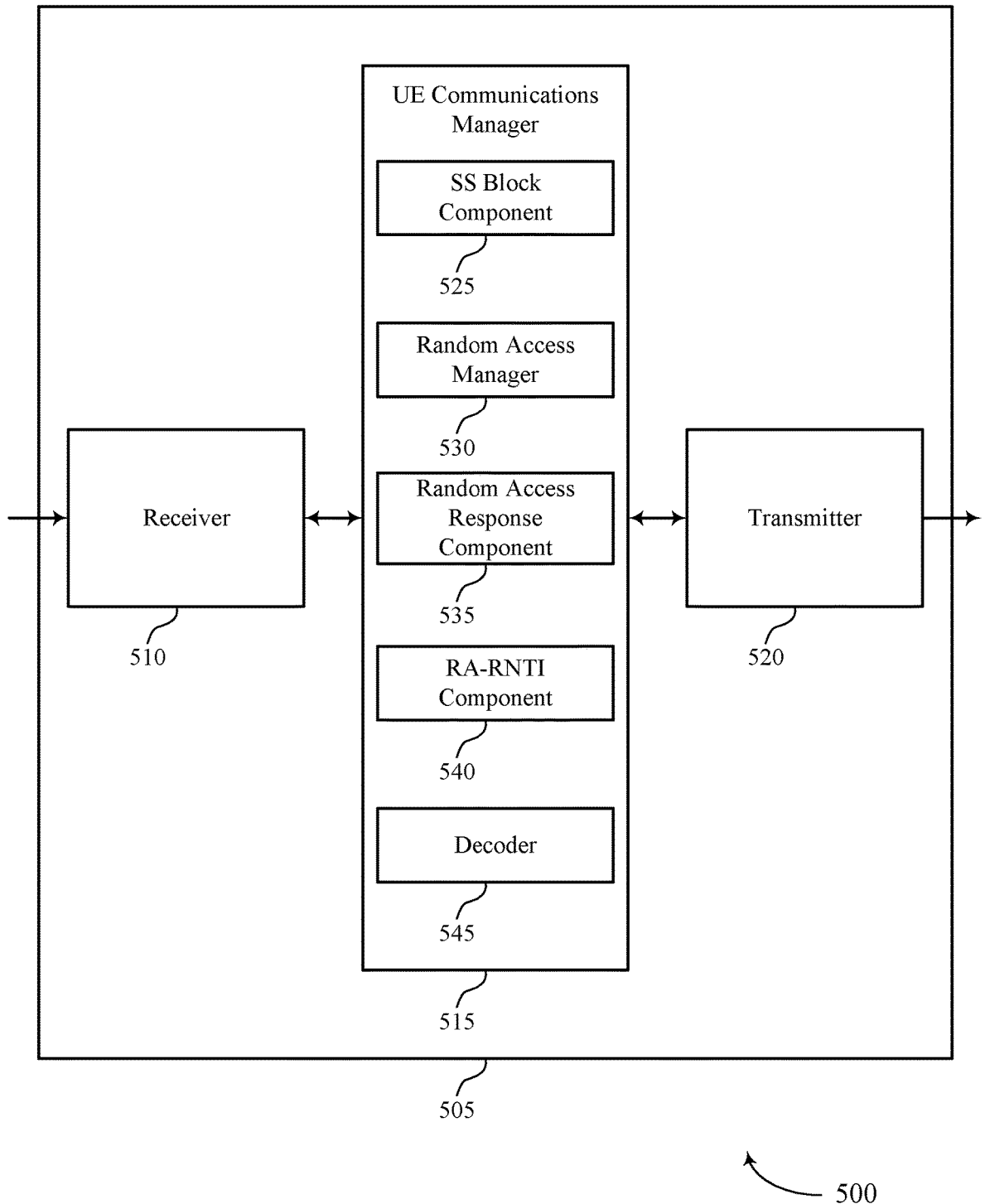

FIG. 5 shows a block diagram 500 of a wireless device 505 that supports random access response techniques based on synchronization signal block transmissions in accordance with aspects of the present disclosure. Wireless device 505 may be an example of aspects of a wireless device 405 or a UE 115 as described with reference to FIG. 4. Wireless device 505 may include receiver 510, UE communications manager 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to random access response techniques based on synchronization signal block transmissions, etc.). Information may be passed on to other components of the device 505. Receiver 510 may be an example of aspects of transceiver 735 described with reference to FIG. 7. Receiver 510 may utilize a single antenna or a set of antennas.

UE communications manager 515 may be an example of aspects of UE communications manager 715 described with reference to FIG. 7. UE communications manager 515 may also include SS block component 525, random access manager 530, random access response component 535, RA-RNTI component 540, and decoder 545. In some cases, UE communications manager 515 may also include a beam sweep component.

SS block component 525 may receive a synchronization signal block (SSB) of a set of SSBs transmitted by a base station 105. In some cases, the beam sweep component may receive an SSB of a set of SSBs transmitted by a base station 105. Random access manager 530 may identify random access resources for transmitting a random access preamble based on the received SSB and transmit the random access preamble to the base station 105 using the random access resources.

Random access response component 535 may monitor for a random access response from the base station 105. In some cases, the random access response may include information for one or more UEs 115 and have a corresponding control channel transmission addressed by a RA-RNTI. In some cases, a single random access response message, corresponding to a first random access resource, contains information for each UE 115 that transmits a random access preamble within the first random access resource. In some cases, two or more random access responses are transmitted, and each random access response is for a different subset of a set of UEs 115. In some cases, the monitoring for the random access response includes identifying two or more random access responses. In some cases, a first random access response message includes an indication of one or more preamble IDs, one or more SSBs, one or more random access resources, or any combination thereof, for which the first random access response message is carrying information. In some cases, the indication includes a flag, a bitmap identifying preambles, SSBs, random access resources, specific information for additional random access response messages, or any combination thereof. In some cases, the random access response may indicate a preamble index.

RA-RNTI component 540 may determine the RA-RNTI for the UE 115 based on one or more of the identified random access resources, the SSB, or an SSB index of the SSB. In some cases, the RA-RNTI may be determined based on a symbol index within a slot. In some cases, the RA-RNTI may be determined based on a slot index within a subframe. In some cases, multiple RA-RNTIs are associated with the same random access resource and are associated with one or more corresponding SSBs. In some cases, a single RA-RNTI is associated with multiple random access resources and one or more of the SSBs are associated with one or more random access resources. In some cases, RA-RNTI component 540 may determine the RA-RNTI based on the SSB index when a set of SSBs are mapped to a single random access resource. In some examples, the SSB index is a relative SSB index among the set of SSBs that are mapped to the single random access resource. Additionally or alternatively, the RA-RNTI is independent from the SSB index of the SSB when a single SSB is mapped to a single random access resource.

Decoder 545 may decode the control channel transmission based on the RA-RNTI. In some cases, two or more random access responses may be ordered and attempted to be decoded according to the ordering.

Transmitter 520 may transmit signals generated by other components of the device. In some examples, transmitter 520 may be collocated with receiver 510 in a transceiver module. For example, transmitter 520 may be an example of aspects of transceiver 735 described with reference to FIG. 7. Transmitter 520 may utilize a single antenna or a set of antennas.

Figure 6:
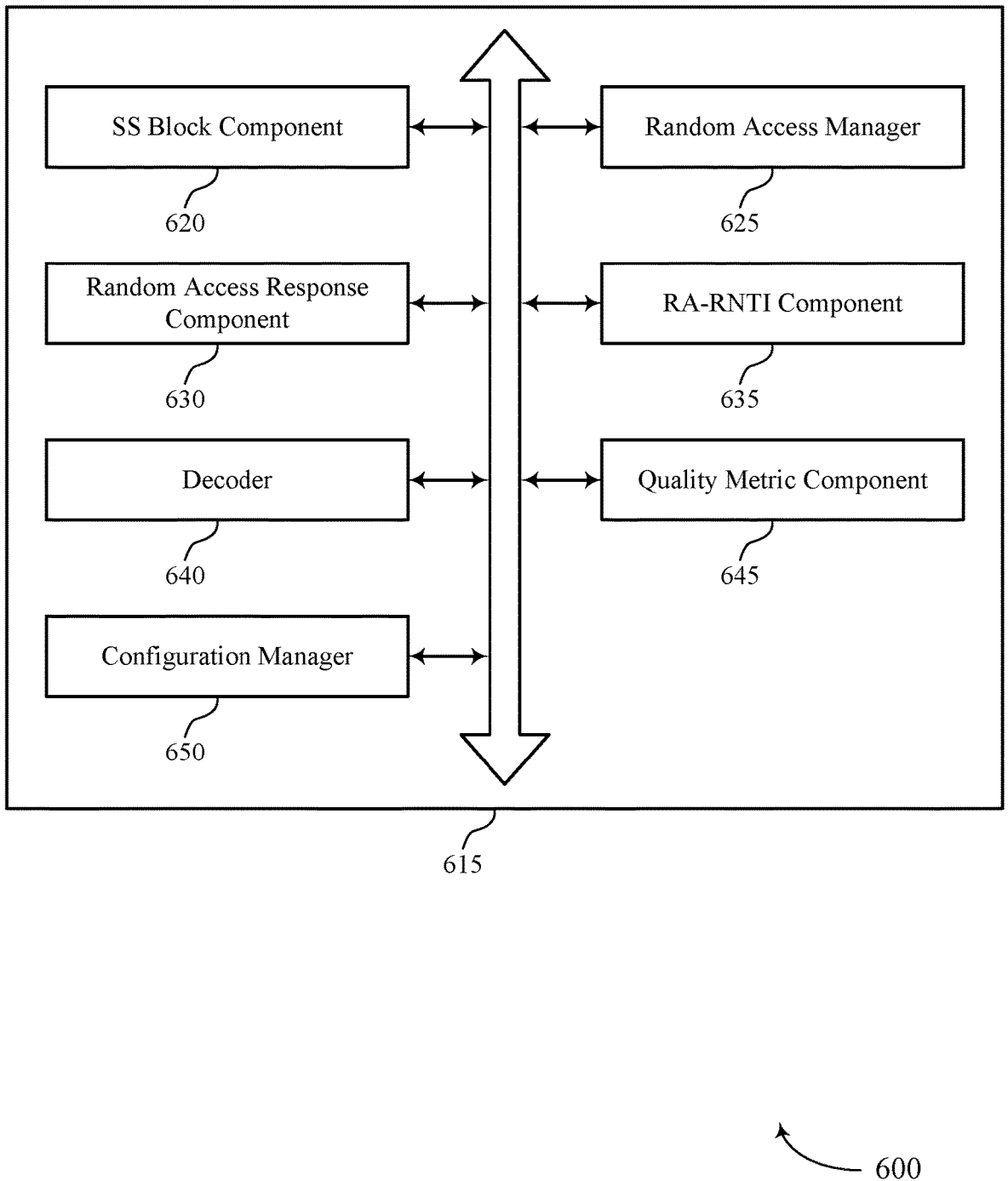

FIG. 6 shows a block diagram 600 of UE communications manager 615 that supports random access response techniques based on synchronization signal block transmissions in accordance with aspects of the present disclosure. UE communications manager 615 may be an example of aspects of UE communications manager 415, 515, or 715 described with reference to FIGS. 4, 5, and 7. UE communications manager 615 may include SS block component 620, random access manager 625, random access response component 630, RA-RNTI component 635, decoder 640, quality metric component 645, and configuration manager 650. In some cases, UE communications manager 515 may also include a beam sweep component. Each of these modules may communicate, directly or indirectly, with one another (e.g., via one or more buses).

SS block component 620 may receive, at a UE 115, a synchronization signal block (SSB) of a set of SSBs transmitted by a base station 105. In some cases, the beam sweep component may receive an SSB of a set of SSBs transmitted by a base station 105. Random access manager 625 may identify random access resources for transmitting a random access preamble based on the received SSB and transmit the random access preamble to the base station 105 using the random access resources.

Random access response component 630 may monitor for a random access response from the base station 105 within a control channel that includes cyclic redundancy check bits scrambled by a RA-RNTI. In some cases, the random access response may include information for one or more UEs 115. In some cases, a single random access response message, corresponding to a first random access resource, contains information for each UE 115 that transmits a random access preamble within the first random access resource. In some cases, two or more random access responses are transmitted, and each random access response is for a different subset of a set of UEs 115. In some cases, the monitoring for the random access response includes identifying two or more random access responses. In some cases, a first random access response message includes an indication of one or more preamble IDs, one or more SSBs, one or more random access resources, or any combination thereof, for which the first random access response message is carrying information. In some cases, the indication includes a flag, a bitmap identifying preambles, SSBs, random access resources, specific information for additional random access response messages, or any combination thereof. In some cases, the random access response may indicate a preamble index.

RA-RNTI component 635 may determine the RA-RNTI for the UE 115 based on one or more of the identified random access resources, the SSB, or an SSB index of the SSB. In some cases, the RA-RNTI may be determined based on a symbol index within a slot. In some cases, the RA-RNTI may be determined based on a slot index within a subframe. In some cases, multiple RA-RNTIs are associated with the same random access resource and are associated with one or more corresponding SSBs. In some cases, a single RA-RNTI is associated with multiple random access resources and one or more of the SSBs are associated with one or more random access resources. In some cases, RA-RNTI component 635 may determine the RA-RNTI based on the SSB index when a set of SSBs are mapped to a single random access resource. In some examples, the SSB index is a relative SSB index among the set of SSBs that are mapped to the single random access resource. Additionally or alternatively, the RA-RNTI is independent from the SSB index of the SSB when a single SSB is mapped to a single random access resource.

Decoder 640 may decode the control channel transmission based on the RA-RNTI. In some cases, two or more random access responses may be ordered and attempted to be decoded according to the ordering. Quality metric component 645 may order the two or more random access responses based on a quality metric.

Configuration manager 650 may identify configuration information that indicates whether one or multiple RA-RNTIs are configured for one or more SSB, whether single or multiple random access response messages may be received based on the random access preamble, or any combination thereof. In some cases, the configuration information may be predetermined configuration information, or periodically updated by a base station 105. In some cases, the configuration information may be based on a capability of the UE 115. In some cases, the configuration information may be, received from the base station 105 such as in a master information block (MIB), an RMSI, a system information block (SIB), or a radio resource control (RRC) message, is received from an upper layer, or received from a different base station 105. In some cases, the different SSBs of the set of SSBs may have different configuration information. In some cases, the configuration information may be based on a number of actually transmitted SSBs.

Figure 7:
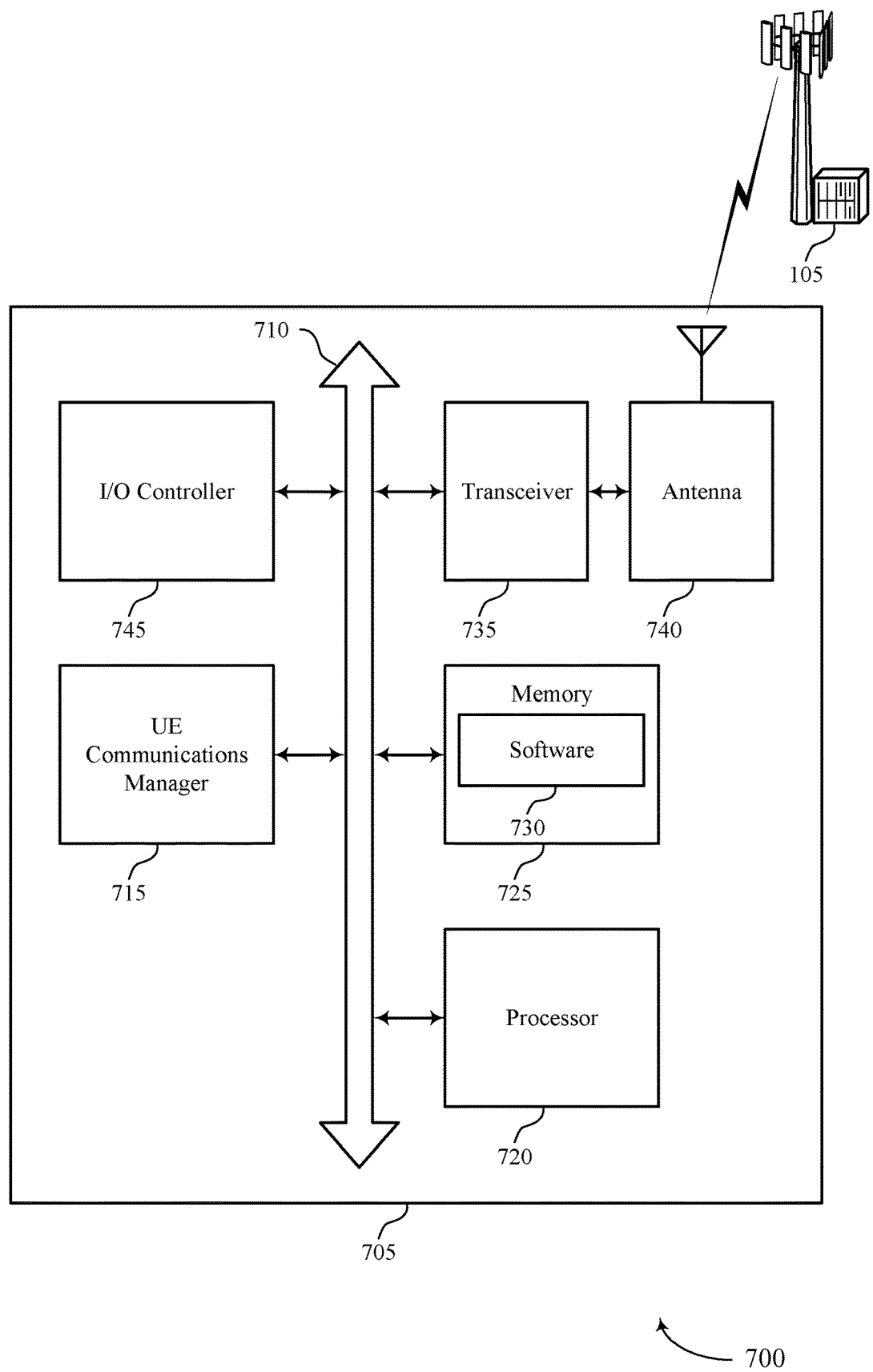
FIG. 7 illustrates a block diagram of a system including a UE that supports random access response techniques based on synchronization signal block transmissions in accordance with aspects of the present disclosure.

FIG. 7 shows a diagram of a system 700 including a device 705 that supports random access response techniques based on synchronization signal block transmissions in accordance with aspects of the present disclosure. Device 705 may be an example of or include the components of wireless device 405, wireless device 505, or a UE 115 as described above, e.g., with reference to FIGS. 4 and 5.

Device 705 may include components for bi-directional voice and data communications including components for transmitting and receiving communications, including UE communications manager 715, processor 720, memory 725, software 730, transceiver 735, antenna 740, and I/O controller 745. These components may be in electronic communication via one or more buses (e.g., bus 710). Device 705 may communicate wirelessly with one or more base stations 105.

Processor 720 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 720 may be configured to operate a memory array using a memory controller. In other cases, a memory controller may be integrated into processor 720. Processor 720 may be configured to execute computer-readable instructions stored in a memory to perform various functions (e.g., functions or tasks supporting random access response techniques based on synchronization signal block transmissions).

Memory 725 may include random access memory (RAM) and read only memory (ROM). Memory 725 may store computer-readable, computer-executable software 730 including instructions that, when executed, cause the processor to perform various functions described herein. In some cases, memory 725 may contain, among other things, a basic input/output system (BIOS) which may control basic hardware or software operation such as the interaction with peripheral components or devices.

Software 730 may include code to implement aspects of the present disclosure, including code to support random access response techniques based on synchronization signal block transmissions. Software 730 may be stored in a non-transitory computer-readable medium such as system memory or other memory. In some cases, software 730 may not be directly executable by the processor but may cause a computer (e.g., when compiled and executed) to perform functions described herein.

Transceiver 735 may communicate bi-directionally, via one or more antennas, wired, or wireless links as described above. For example, transceiver 735 may represent a wireless transceiver and may communicate bi-directionally with another wireless transceiver. Transceiver 735 may also include a modem to modulate the packets and provide the modulated packets to the antennas for transmission, and to demodulate packets received from the antennas.

In some cases, the wireless device 705 may include a single antenna 740. However, in some cases the device 705 may have more than one antenna 740, which may be capable of concurrently transmitting or receiving multiple wireless transmissions.

I/O controller 745 may manage input and output signals for device 705. I/O controller 745 may also manage peripherals not integrated into device 705. In some cases, I/O controller 745 may represent a physical connection or port to an external peripheral. In some cases, I/O controller 745 may utilize an operating system such as iOS®, ANDROID®, MS-DOS®, MS-WINDOWS®, OS/2®, UNIX®, LINUX®, or another known operating system. In other cases, I/O controller 745 may represent or interact with a modem, a keyboard, a mouse, a touchscreen, or a similar device. In some cases, I/O controller 745 may be implemented as part of a processor. In some cases, a user may interact with device 705 via I/O controller 745 or via hardware components controlled by I/O controller 745.

Figure 8:
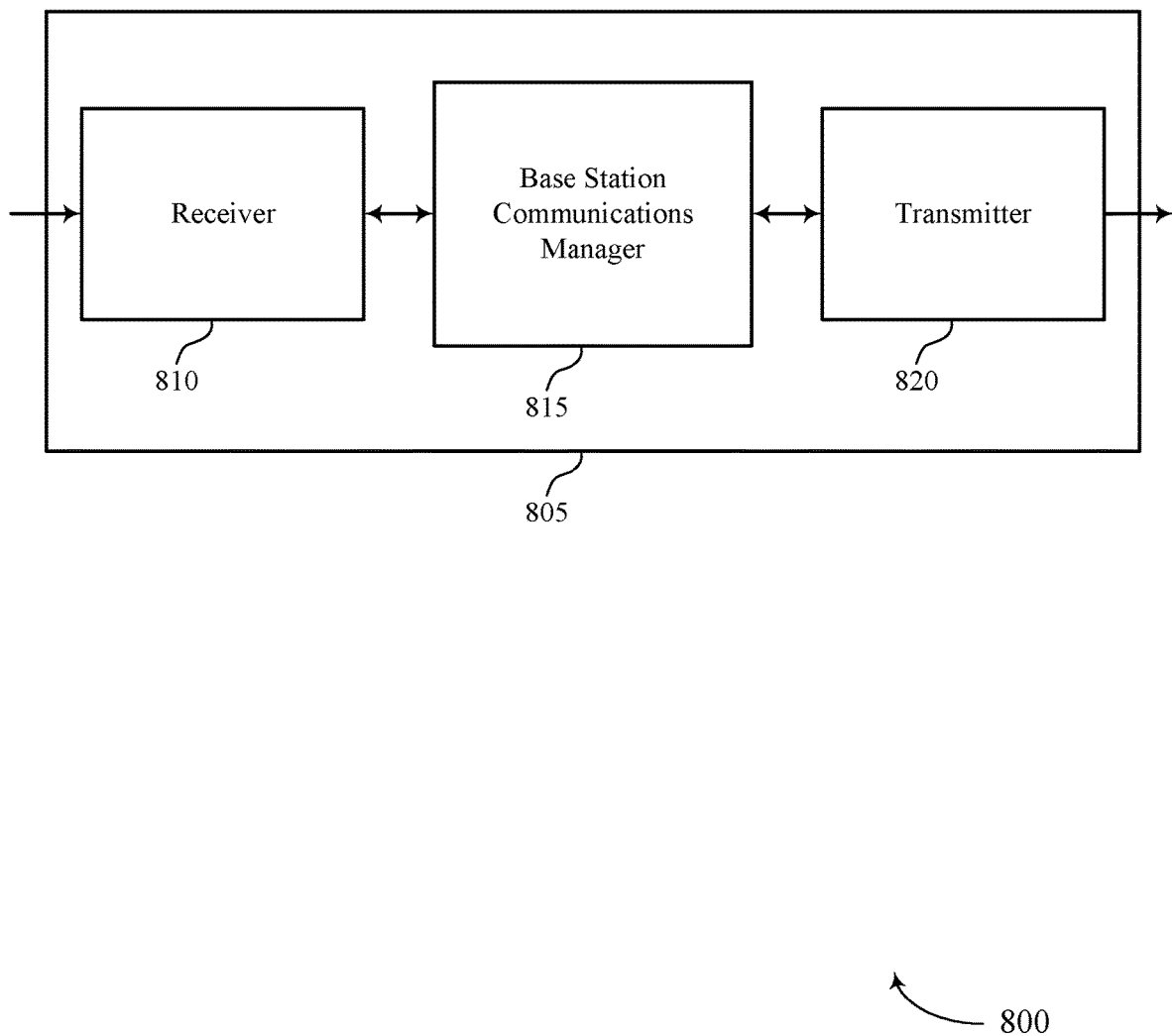
FIGS. 8 through 10 show block diagrams of a device that supports random access response techniques based on synchronization signal block transmissions in accordance with aspects of the present disclosure.

FIG. 8 shows a block diagram 800 of a wireless device 805 that supports random access response techniques based on synchronization signal block transmissions in accordance with aspects of the present disclosure. Wireless device 805 may be an example of aspects of a base station 105 as described herein. Wireless device 805 may include receiver 810, base station communications manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to random access response techniques based on synchronization signal block transmissions, etc.). Information may be passed on to other components of the device. Receiver 810 may be an example of aspects of transceiver 1135 described with reference to FIG. 11. Receiver 810 may utilize a single antenna or a set of antennas.

Base station communications manager 815 may be an example of aspects of base station communications manager 1115 described with reference to FIG. 11.

Base station communications manager 815 and/or at least some of its various sub-components may be implemented in hardware, software executed by a processor, firmware, or any combination thereof. If implemented in software executed by a processor, the functions of base station communications manager 815 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. Base station communications manager 815 and/or at least some of its various sub-components may be physically located at various positions, including being distributed such that portions of functions are implemented at different physical locations by one or more physical devices. In some examples, base station communications manager 815 and/or at least some of its various sub-components may be a separate and distinct component in accordance with various aspects of the present disclosure. In other examples, base station communications manager 815 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 815 may identify a configuration for random access resources associated with one or more synchronization signal blocks (SSBs), a number of random access responses that are to be transmitted that are associated with one or more random access resources, and a random access radio network temporary identifier (RA-RNTI) for a control channel transmission associated with the number of random access responses, transmit a set of SSBs to at least a first UE 115, receive a random access preamble from at least the first UE 115 via a first random access resource, identify one or more SSBs associated with the random access preamble based on the configuration of the random access resources and the first random access resource, generate one or more random access response messages based on the random access preamble, the one or more random access response messages including information for at least the first UE 115, where the RA-RNTI (e.g., for one or more UEs 115) is determined based on one or more of the random access resources, the SSB, or an SSB index of the SSB, used for associated random access preambles from the one or more UEs 115, and transmit the one or more random access response messages within a control channel that includes cyclic redundancy check bits scrambled by the RA-RNTI.

Transmitter 820 may transmit signals generated by other components of the device 805. In some examples, transmitter 820 may be collocated with receiver 810 in a transceiver module. For example, transmitter 820 may be an example of aspects of transceiver 1135 described with reference to FIG. 11. Transmitter 820 may utilize a single antenna or a set of antennas.

Figure 9:
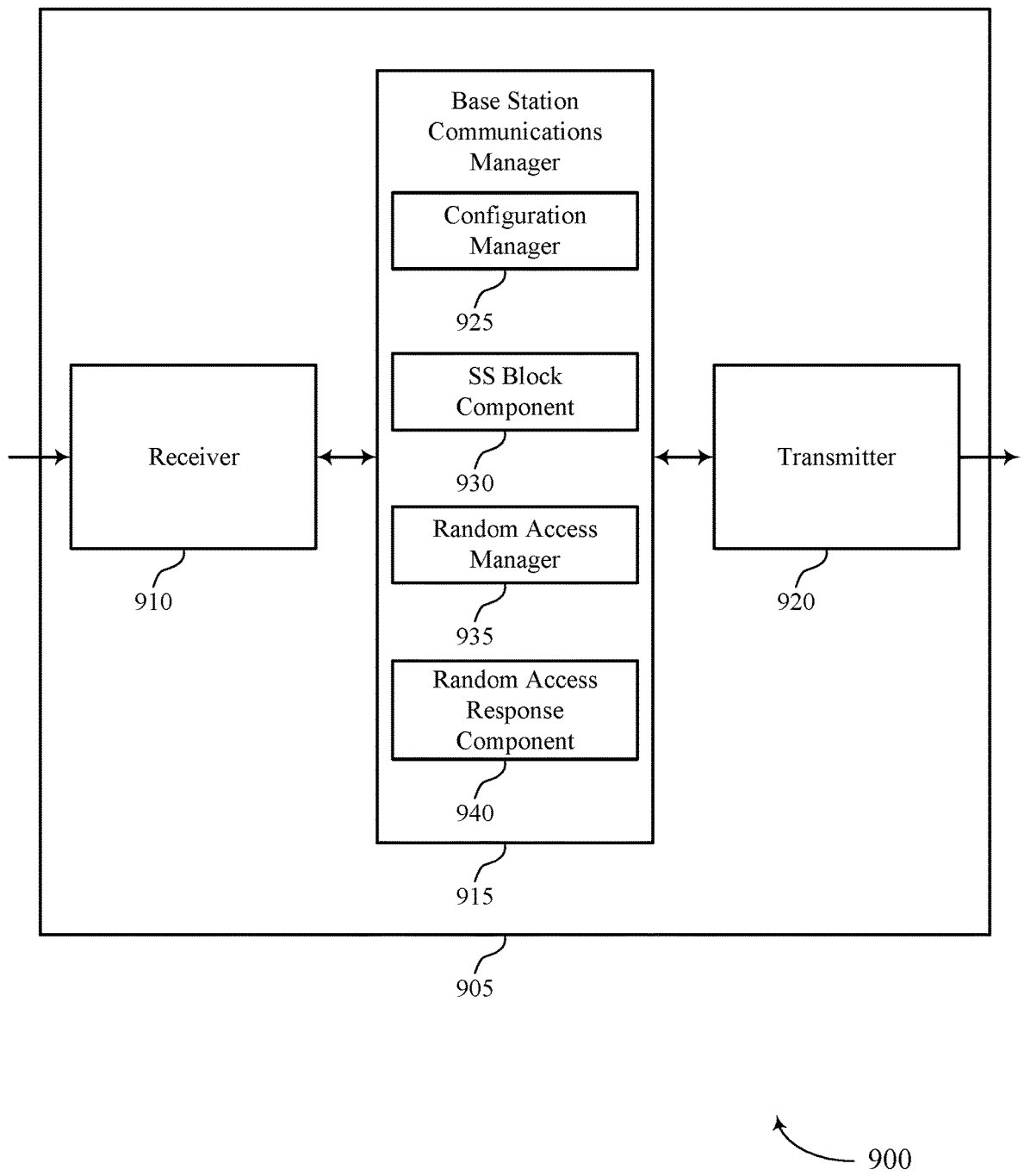

FIG. 9 shows a block diagram 900 of a wireless device 905 that supports random access response techniques based on synchronization signal block transmissions in accordance with aspects of the present disclosure. Wireless device 905 may be an example of aspects of a wireless device 805 or a base station 105 as described with reference to FIG. 8. Wireless device 905 may include receiver 910, base station communications manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to random access response techniques based on synchronization signal block transmissions, etc.). Information may be passed on to other components of the device 905. Receiver 910 may be an example of aspects of transceiver 1135 described with reference to FIG. 11. Receiver 910 may utilize a single antenna or a set of antennas.

Base station communications manager 915 may be an example of aspects of base station communications manager 1115 described with reference to FIG. 11. Base station communications manager 915 may also include configuration manager 925, SS block component 930, random access manager 935, and random access response component 940.

Configuration manager 925 may identify a configuration for random access resources associated with one or more synchronization signal blocks (SSBs), a number of random access responses that are to be transmitted that are associated with one or more random access resources, and a random access radio network temporary identifier (RA-RNTI) for a control channel transmission associated with the number of random access responses. In some cases, the configuration information may be predetermined configuration information, or periodically updated by a base station 105. In some cases, the configuration information may be based on a capability of the UE 115. In some cases, configuration information may be, received from the base station 105 such as in a master information block (MIB) message, an RMSI message, a system information block (SIB) message, or a radio resource control (RRC) message, provided by an upper layer, received from a different base station 105, or any combination thereof. In some cases, the different SSBs of the set of SSBs may have different configuration information. In some cases, the configuration information may be based on a number of actually transmitted SSBs SS block component 930 may transmit a set of SSBs to at least a first UE 115. Random access manager 935 may receive a random access preamble from at least the first UE 115 via a first random access resource and may identify one or more SSBs associated with the random access preamble based on the configuration of the random access resources and the first random access resource.

Random access response component 940 may generate one or more random access response messages based on the random access preamble, the one or more random access response messages including information for at least the first UE, where the RA-RNTI for one or more UEs 115 is determined based on one or more of the random access resources, the SSB, or an SSB index of the SSB, used for associated random access preambles from the one or more UEs 115, and transmit the one or more random access response messages within a control channel that includes cyclic redundancy check bits scrambled by the RA-RNTI. In some cases, a single random access response message, corresponding to a first random access resource, contains information for each UE 115 that transmits a random access preamble within the first random access resource. In some cases, two or more random access responses are transmitted, and each random access response is for a different subset of a set of UEs 115. In some cases, the first random access response message includes an indication of one or more preamble IDs, one or more SSs, one or more random access resources, or any combination thereof, for which the first random access response message is carrying information. In some cases, the indication includes a flag, a bitmap identifying preambles, SSBs, random access resources, specific information for additional random access response messages, or any combination thereof. In some cases the random access response may indicate a preamble index.

Transmitter 920 may transmit signals generated by other components of the device. In some examples, transmitter 920 may be collocated with receiver 910 in a transceiver module. For example, transmitter 920 may be an example of aspects of transceiver 1135 described with reference to FIG. 11. Transmitter 920 may utilize a single antenna or a set of antennas.

Figure 10:
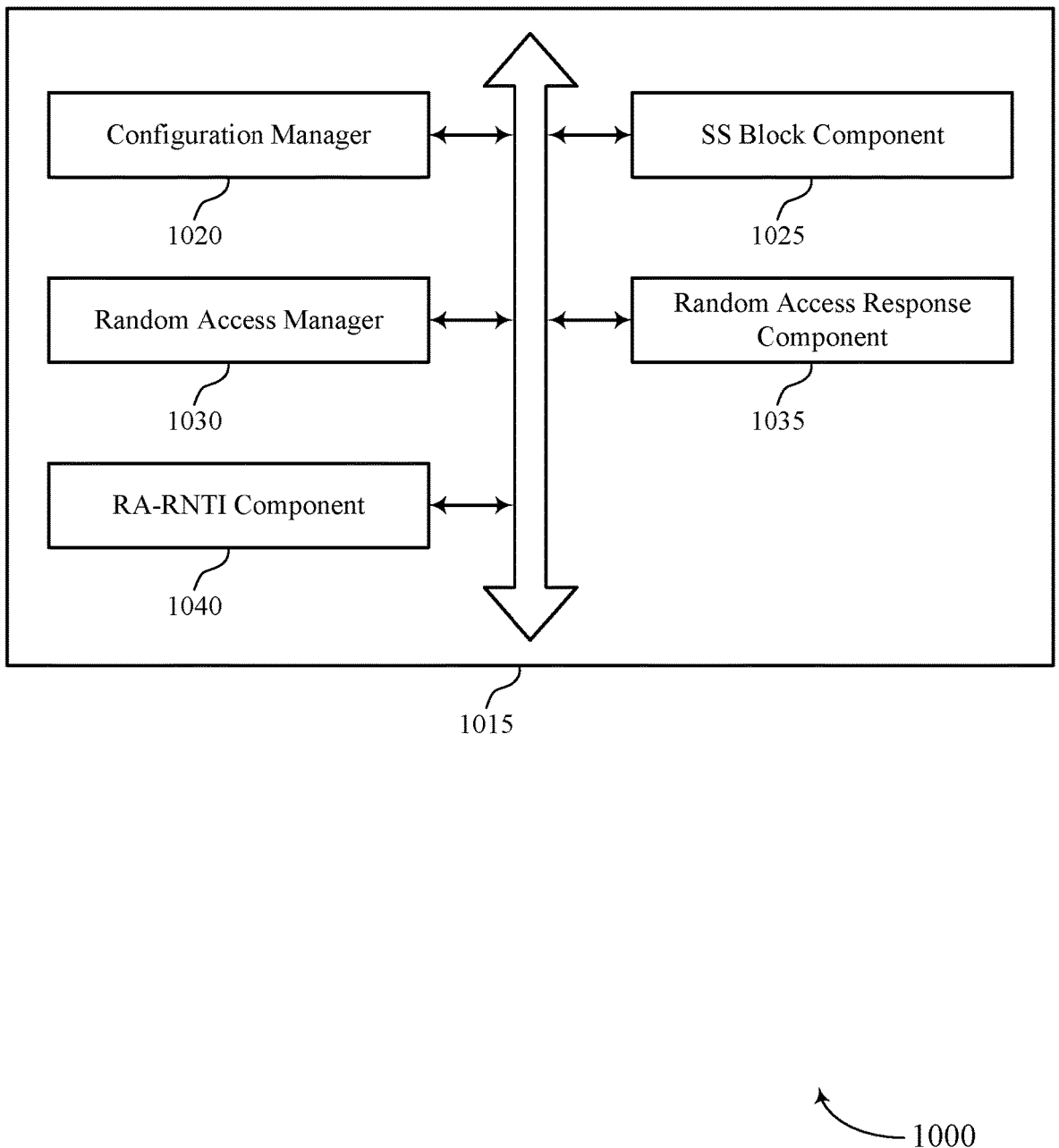

FIG. 10 shows a block diagram 1000 of a base station communications manager 1015 that supports random access response techniques based on synchronization signal block transmissions in accordance with aspects of the present disclosure. Base station communications manager 1015 may be an example of aspects of base station communications manager 815, 915, and 1115 described with reference to FIGS. 8, 9, and 11. Base station communications manager 1015 may include configuration manager 1020, SS block component 1025, random access manager 1030, random access response component 1035, and RA-RNTI component 1040. Each of these modules may communicate, directly or indirectly, with one another (e.g., via one or more buses).

Configuration manager 1020 may identify a configuration for random access resources associated with one or more synchronization signal blocks (SSBs), a number of random access responses that are to be transmitted that are associated with one or more random access resources, and a random access radio network temporary identifier (RA-RNTI) for a control channel transmission associated with the number of random access responses. In some cases, the configuration information may be predetermined configuration information, or periodically updated by a base station 105. In some cases, the configuration information may be based on a capability of the UE 115. In some cases, the configuration information may be, received from the base station 105 such as in a master information block (MIB) message, an RMSI message, a system information block (SIB) message, a radio resource control (RRC) message, provided by an upper layer, received from a different base station 105, or any combination thereof. In some cases, the different SSBs of the set of SSBs may have different configuration information. In some cases, the configuration information may be based on a number of actually transmitted SSBs.

SS block component 1025 may transmit a set of SSBs to at least a first UE 115. Random access manager 1030 may receive a random access preamble from at least the first UE 115 via a first random access resource and identify one or more SSBs associated with the random access preamble based on the configuration of the random access resources and the first random access resource.

Random access response component 1035 may generate one or more random access response messages based on the random access preamble, the one or more random access response messages including information for at least the first UE 115, where the RA-RNTI for one or more UEs 115 is determined based on one or more of the random access resources, the SSB, or an SSB index of the SSB, used for associated random access preambles from the one or more UEs 115, and transmit the one or more random access response messages within a control channel that includes cyclic redundancy check bits scrambled by the RA-RNTI. In some cases, a single random access response message, corresponding to a first random access resource, contains information for each UE 115 that transmits a random access preamble within the first random access resource. In some cases, two or more random access responses are transmitted, and each random access response is for a different subset of a set of UEs 115. In some cases, the first random access response message includes an indication of one or more preamble IDs, one or more SSs, one or more random access resources, or any combination thereof, for which the first random access response message is carrying information. In some cases, the indication includes a flag, a bitmap identifying preambles, SSBs, random access resources, specific information for additional random access response messages, or any combination thereof.

RA-RNTI component 1040 may identify RA-RNTIs for use with a random access response. In some cases, the multiple RA-RNTIs are associated with the same random access resource and are associated with one or more corresponding SSBs. In some cases, a single RA-RNTI is associated with multiple random access resources and one or more of the SSBs are associated with one or more random access resources.

Figure 11:
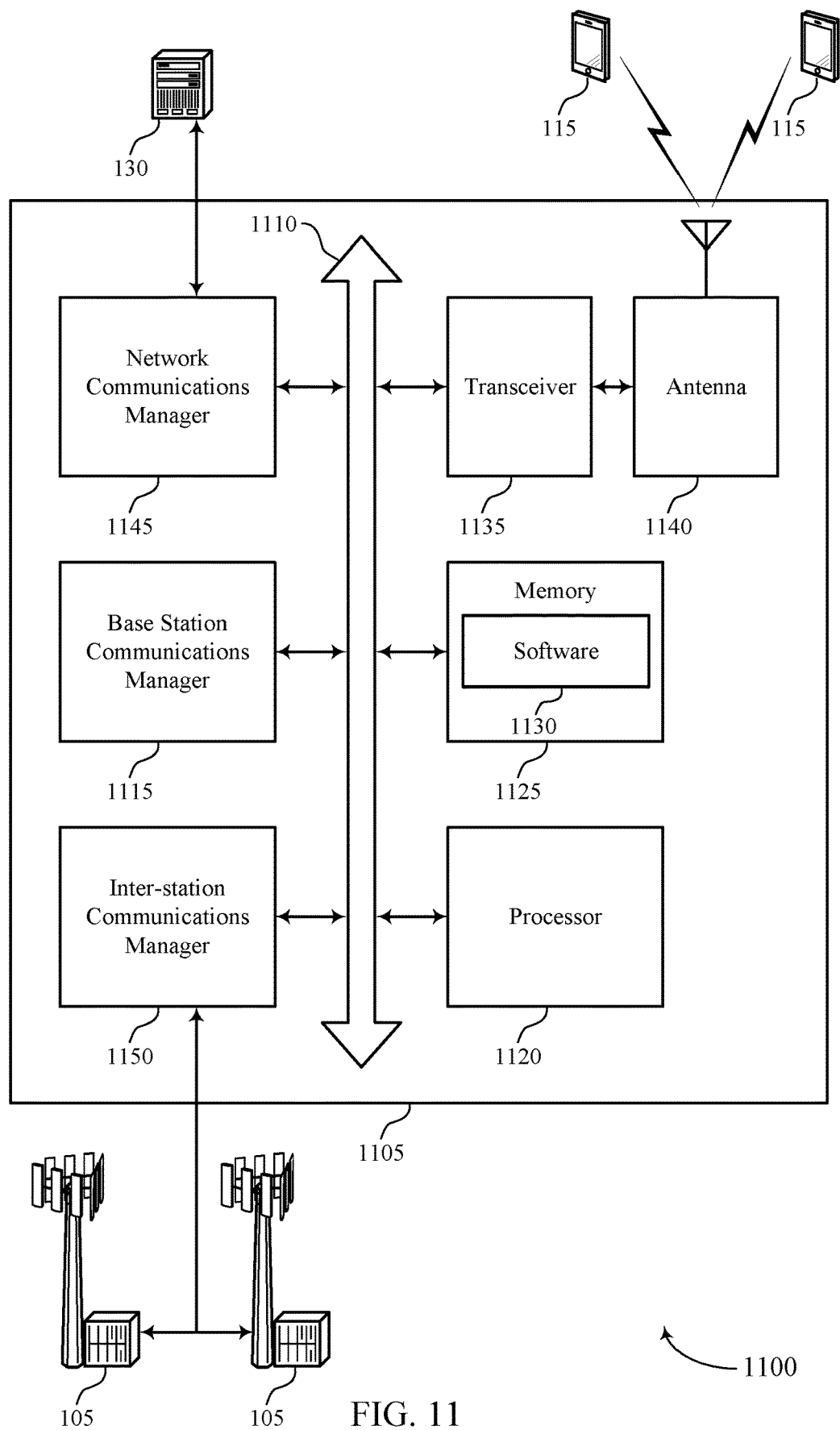
FIG. 11 illustrates a block diagram of a system including a base station that supports random access response techniques based on synchronization signal block transmissions in accordance with aspects of the present disclosure.

FIG. 11 shows a diagram of a system 1100 including a device 1105 that supports random access response techniques based on synchronization signal block transmissions in accordance with aspects of the present disclosure. Device 1105 may be an example of or include the components of base station 105 as described above, e.g., with reference to FIG. 1. Device 1105 may include components for bi-directional voice and data communications including components for transmitting and receiving communications, including base station communications manager 1115, processor 1120, memory 1125, software 1130, transceiver 1135, antenna 1140, network communications manager 1145, and inter-station communications manager 1150. These components may be in electronic communication via one or more buses (e.g., bus 1110). Device 1105 may communicate wirelessly with one or more UEs 115.

Processor 1120 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1120 may be configured to operate a memory array using a memory controller. In other cases, a memory controller may be integrated into processor 1120. Processor 1120 may be configured to execute computer-readable instructions stored in a memory to perform various functions (e.g., functions or tasks supporting random access response techniques based on synchronization signal block transmissions).

Memory 1125 may include RAM and ROM. The memory 1125 may store computer-readable, computer-executable software 1130 including instructions that, when executed, cause the processor to perform various functions described herein. In some cases, memory 1125 may contain, among other things, a BIOS which may control basic hardware or software operation such as the interaction with peripheral components or devices.

Software 1130 may include code to implement aspects of the present disclosure, including code to support random access response techniques based on synchronization signal block transmissions. Software 1130 may be stored in a non-transitory computer-readable medium such as system memory or other memory. In some cases, software 1130 may not be directly executable by the processor but may cause a computer (e.g., when compiled and executed) to perform functions described herein.

Transceiver 1135 may communicate bi-directionally, via one or more antennas, wired, or wireless links as described above. For example, transceiver 1135 may represent a wireless transceiver and may communicate bi-directionally with another wireless transceiver. Transceiver 1135 may also include a modem to modulate the packets and provide the modulated packets to the antennas for transmission, and to demodulate packets received from the antennas.

In some cases, the wireless device 1105 may include a single antenna 1140. However, in some cases the device may have more than one antenna 1140, which may be capable of concurrently transmitting or receiving multiple wireless transmissions.

Network communications manager 1145 may manage communications with the core network (e.g., via one or more wired backhaul links). For example, the network communications manager 1145 may manage the transfer of data communications for client devices, such as one or more UEs 115.

Inter-station communications manager 1150 may manage communications with other base station 105, and may include a controller or scheduler for controlling communications with UEs 115 in cooperation with other base stations 105. For example, the inter-station communications manager 1150 may coordinate scheduling for transmissions to UEs 115 for various interference mitigation techniques such as beamforming or joint transmission. In some examples, inter-station communications manager 1150 may provide an X2 interface within a Long Term Evolution (LTE)/LTE-A wireless communication network technology to provide communication between base stations 105.

Figure 12:
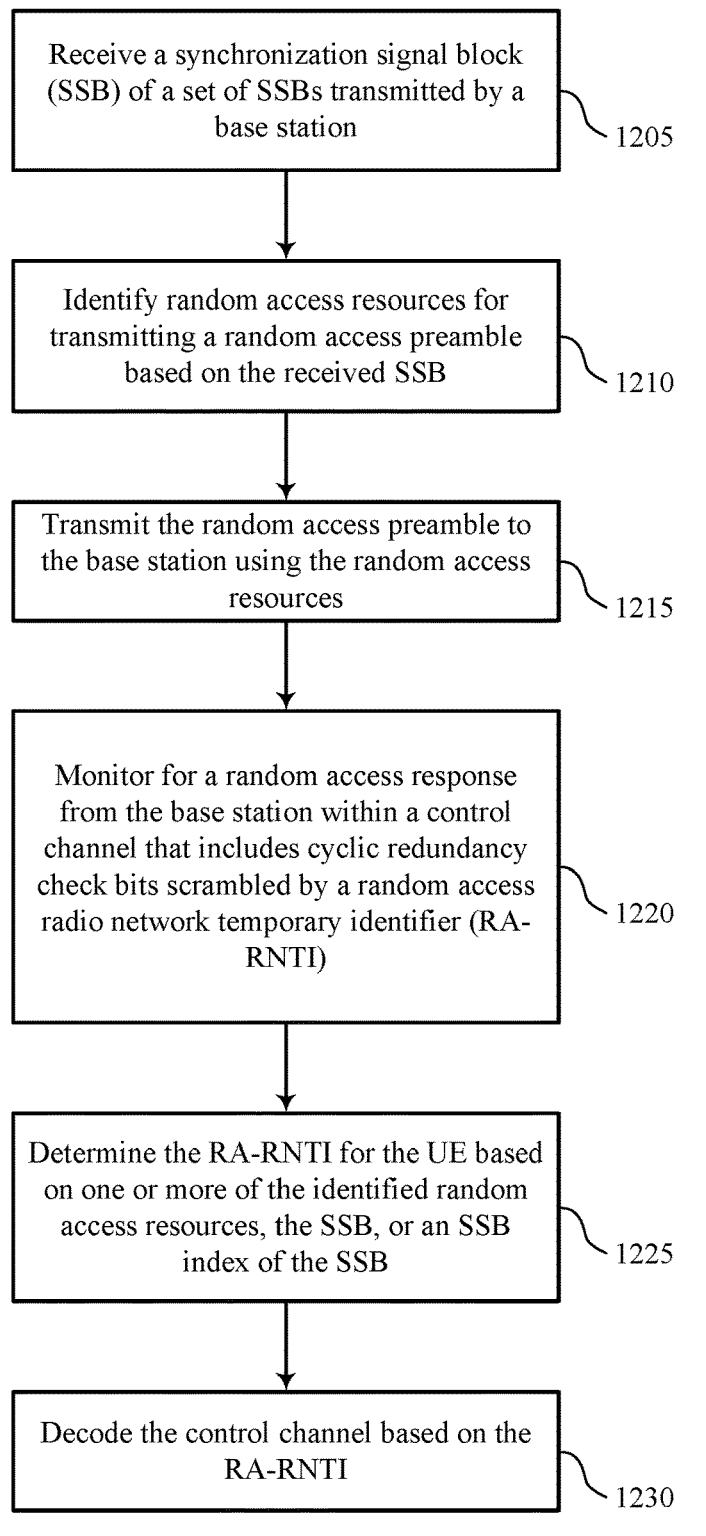
FIGS. 12 through 14 illustrate methods for random access response techniques based on synchronization signal block transmissions in accordance with aspects of the present disclosure.

FIG. 12 shows a flowchart illustrating a method 1200 for random access response techniques based on synchronization signal block transmissions in accordance with aspects of the present disclosure. The operations of method 1200 may be implemented by a UE 115 or its components as described herein. For example, the operations of method 1200 may be performed by UE communications manager 415, 515, 615, and 715 as described with reference to FIGS. 4 through 7. In some examples, a UE 115 may execute a set of codes to control the functional elements of the device to perform the functions described below. Additionally or alternatively, the UE 115 may perform aspects of the functions described below using special-purpose hardware.

At 1205, the UE 115 may receive a synchronization signal block (SSB) of a plurality of SSBs transmitted by a base station. The operations of 1205 may be performed according to the methods described herein. In certain examples, aspects of the operations of 1205 may be performed by SS block component 415, 525, 620, and 715 as described with reference to FIGS. 4 through 7.

At 1210, the UE 115 may identify random access resources for transmitting a random access preamble based on the received SSB. The operations of 1210 may be performed according to the methods described herein. In certain examples, aspects of the operations of 1210 may be performed by random access manager 415, 530, 625, and 715 as described with reference to FIGS. 4 through 7.

At 1215, the UE 115 may transmit the random access preamble to the base station using the random access resources. The operations of 1215 may be performed according to the methods described herein. In certain examples, aspects of the operations of 1215 may be performed by random access manager 415, 530, 625, and 715 as described with reference to FIGS. 4 through 7.

At 1220, the UE 115 may monitor for a random access response from the base station within a control channel that includes cyclic redundancy check bits scrambled by a RA-RNTI, the random access response including information for one or more UEs. The operations of 1220 may be performed according to the methods described herein. In certain examples, aspects of the operations of 1220 may be performed by random access response component 415, 535, 630, and 715 as described with reference to FIGS. 4 through 7.

At 1225, the UE 115 may determine the RA-RNTI for the UE based on one or more of the identified random access resources, the SSB, or an SSB index of the SSB. In some cases, the UE 115 may determine the RA-RNTI based on a symbol index within a slot. In some cases, the UE 115 may determine the RA-RNTI based on a slot index within a subframe. The operations of 1225 may be performed according to the methods described herein. In certain examples, aspects of the operations of 1225 may be performed by RA-RNTI component 415, 540, 635, and 715 as described with reference to FIGS. 4 through 7.

At 1230, the UE 115 may decode the control channel transmission based on the RA-RNTI. The operations of 1230 may be performed according to the methods described herein. In certain examples, aspects of the operations of 1230 may be performed by decoder 415, 545, 640, and 715 as described with reference to FIGS. 4 through 7.

Figure 13:
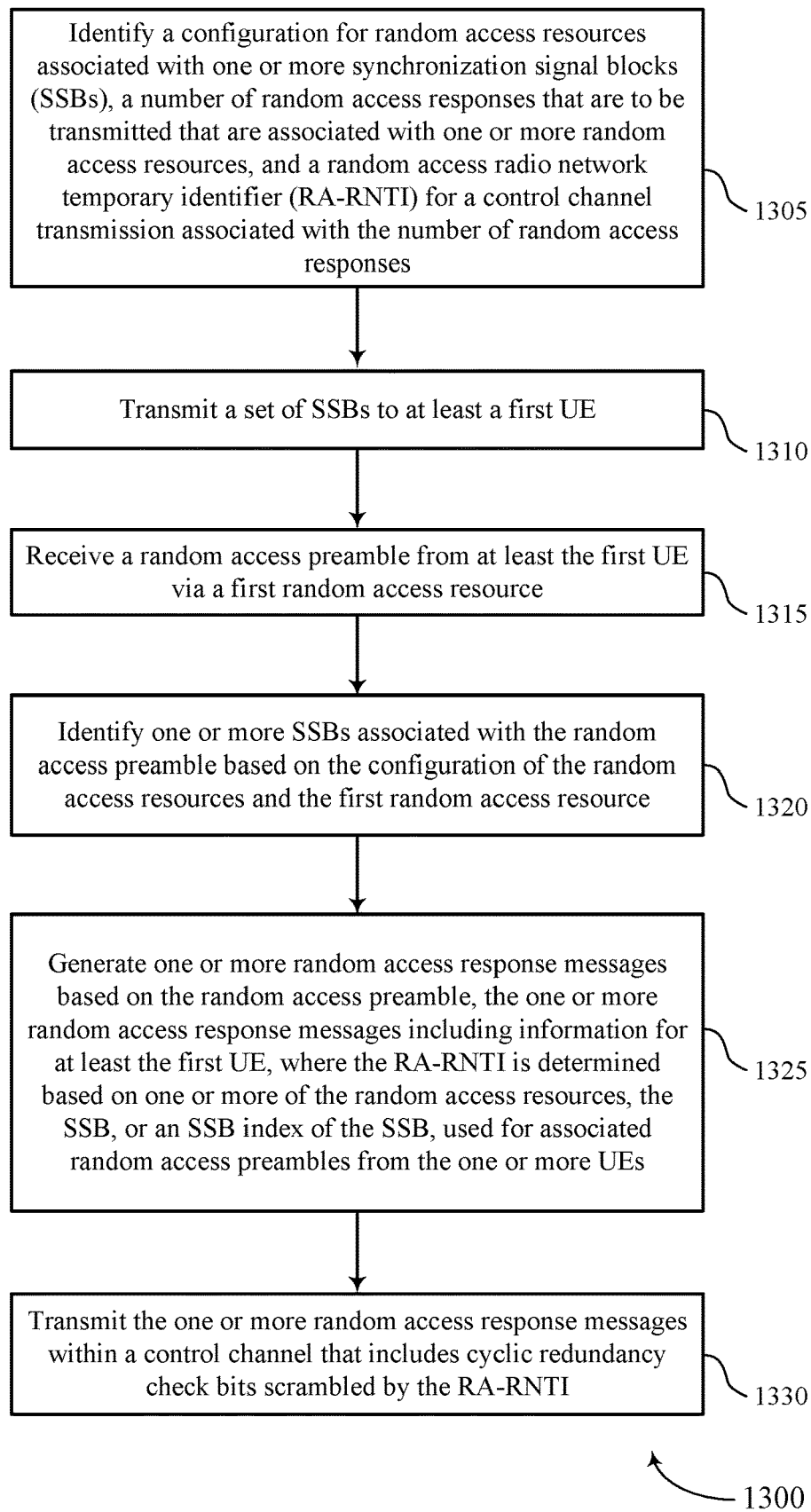

FIG. 13 shows a flowchart illustrating a method 1300 for random access response techniques based on synchronization signal block transmissions in accordance with aspects of the present disclosure. The operations of method 1300 may be implemented by a base station 105 or its components as described herein. For example, the operations of method 1300 may be performed by base station communications manager 815, 915, 1015, and 1115 as described with reference to FIGS. 8 through 11. In some examples, a base station 105 may execute a set of codes to control the functional elements of the device to perform the functions described below. Additionally or alternatively, the base station 105 may perform aspects of the functions described below using special-purpose hardware.

At 1305, the base station 105 may identify a configuration for random access resources associated with one or more synchronization signal blocks (SSBs), a number of random access responses that are to be transmitted that are associated with one or more random access resources, and a random access radio network temporary identifier (RA-RNTI) for a control channel transmission associated with the number of random access responses. The operations of 1305 may be performed according to the methods described herein. In certain examples, aspects of the operations of 1305 may be performed by configuration manager 815, 925, 1020, and 1115 as described with reference to FIGS. 8 through 11.

At 1310, the base station 105 may transmit a plurality of SSBs to at least a first user equipment (UE) 115. The operations of 1310 may be performed according to the methods described herein. In certain examples, aspects of the operations of 1310 may be performed by SS block component 815, 930, 1025, and 1115 as described with reference to FIGS. 8 through 11.

At 1315, the base station 105 may receive a random access preamble from at least the first UE via a first random access resource. The operations of 1315 may be performed according to the methods described herein. In certain examples, aspects of the operations of 1315 may be performed by random access manager 815, 935, 1030, and 1115 as described with reference to FIGS. 8 through 11.

At 1320, the base station 105 may identify one or more SSBs associated with the random access preamble based on the configuration of the random access resources and the first random access resource. The operations of 1320 may be performed according to the methods described herein. In certain examples, aspects of the operations of 1320 may be performed by random access manager 815, 935, 1030, and 1115 as described with reference to FIGS. 8 through 11.

At 1325, the base station 105 may generate one or more random access response messages based on the random access preamble, the one or more random access response messages including information for at least the first UE 115, where the RA-RNTI (e.g., for one or more UEs 115) is determined based on one or more of the random access resources, the SSB, or an SSB index of the SSB, used for associated random access preambles from the one or more UEs 115. In some cases, the RA-RNTI may be determined based on a symbol index within a slot. In some cases, the RA-RNTI may be determined based on a slot index within a subframe. The operations of 1325 may be performed according to the methods described herein. In certain examples, aspects of the operations of 1325 may be performed by random access response component 815, 940, 1035, and 1115 as described with reference to FIGS. 8 through 11.

At 1330, the base station 105 may transmit the one or more random access response messages within a control channel that includes cyclic redundancy check bits scrambled by the RA-RNTI. The operations of 1330 may be performed according to the methods described herein. In certain examples, aspects of the operations of 1330 may be performed by random access response component 815, 940, 1035, and 1115 as described with reference to FIGS. 8 through 11.

Figure 14:
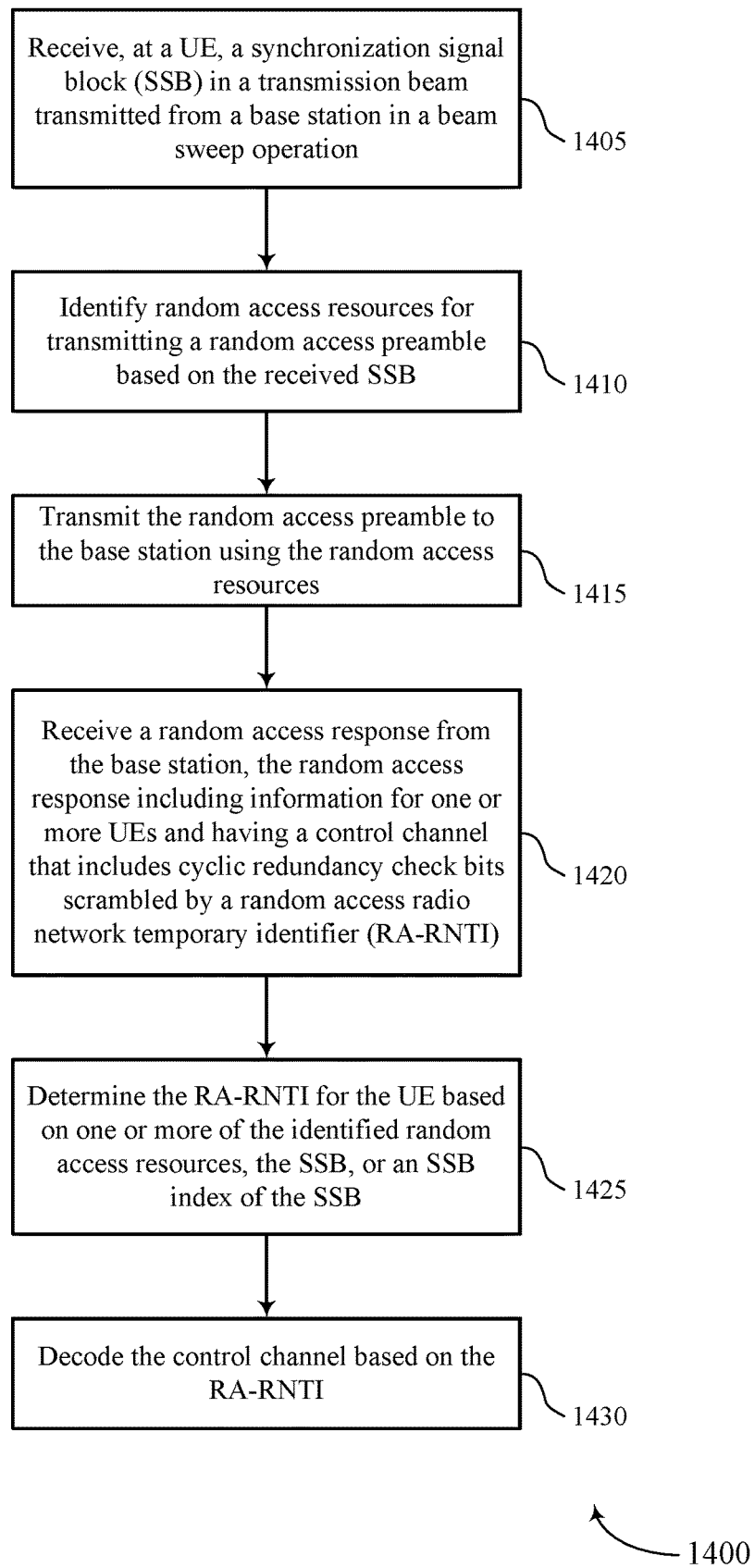

FIG. 14 shows a flowchart illustrating a method 1400 for random access response in beamformed transmissions in accordance with aspects of the present disclosure. The operations of method 1400 may be implemented by a UE 115 or its components as described herein. For example, the operations of method 1400 may be performed by UE communications manager 415, 515, 615, and 715 as described with reference to FIGS. 4 through 7. In some examples, a UE 115 may execute a set of codes to control the functional elements of the device to perform the functions described below. Additionally or alternatively, the UE 115 may perform aspects of the functions described below using special-purpose hardware.

At 1405, the UE 115 may receive a synchronization signal block (SSB) in a transmission beam transmitted from a base station in a beam sweep operation. The operations of 1405 may be performed according to the methods described herein. In certain examples, aspects of the operations of 1405 may be performed by SS block component 415, 525, 620, and 715 as described with reference to FIGS. 4 through 7. In some cases, aspects of the operations of 1405 may be performed by a beam sweep component that may be included in UE communications manager 415, 515, 615, and 715.

At 1410, the UE 115 may identify random access resources for transmitting a random access preamble based on the received SSB. The operations of 1410 may be performed according to the methods described herein. In certain examples, aspects of the operations of 1410 may be performed by random access manager 415, 530, 625, and 715 as described with reference to FIGS. 4 through 7.

At 1415, the UE 115 may transmit the random access preamble to the base station 105 using the random access resources. The operations of 1415 may be performed according to the methods described herein. In certain examples, aspects of the operations of 1415 may be performed by random access manager 415, 530, 625, and 715 as described with reference to FIGS. 4 through 7.

At 1420, the UE 115 may receive a random access response from the base station 105 within a control channel that includes cyclic redundancy check bits scrambled by the RA-RNTI, the random access response including information for one or more UEs 115. The operations of 1420 may be performed according to the methods described herein. In certain examples, aspects of the operations of 1420 may be performed by random access manager 415, 530, 625, and 715 as described with reference to FIGS. 4 through 7.

At 1425, the UE 115 may determine the RA-RNTI for the UE 115 based on one or more of the identified random access resources, the SSB, or an SSB index of the SSB. In some cases, the UE 115 may determine the RA-RNTI based on a symbol index within a slot. In some cases, the UE 115 may determine the RA-RNTI based on a slot index within a subframe. The operations of 1425 may be performed according to the methods described herein. In certain examples, aspects of the operations of 1425 may be performed by RA-RNTI component 415, 540, 635, and 715 as described with reference to FIGS. 4 through 7.

At 1430, the UE 115 may decode the control channel transmission based on the RA-RNTI. The operations of 1430 may be performed according to the methods described herein. In certain examples, aspects of the operations of 1430 may be performed by decoder 415, 545, 640, and 715 as described with reference to FIGS. 4 through 7.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC- FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
receiving, at a user equipment (UE), a synchronization signal block (SSB) of a plurality of SSBs transmitted by a network entity;
identifying random access resources for transmitting a random access preamble based at least in part on the received SSB;
transmitting the random access preamble to the network entity using the random access resources;
monitoring for a plurality of random access responses from the network entity within a control channel that includes cyclic redundancy check bits scrambled by a random access radio network temporary identifier (RA-RNTI);
identifying, based at least in part on the monitoring, two or more random access responses;
ordering the two or more random access responses based at least in part on a quality metric;
determining the RA-RNTI for the UE based at least in part on one or more of the identified random access resources, the SSB, or an SSB index of the SSB; and
decoding one or more of the two or more random access responses based at least in part on the RA-RNTI and the ordering.

2. The method of claim 1, wherein determining the RA-RNTI for the UE further comprises:
determining the RA-RNTI based at least in part on a symbol index within a slot.

3. The method of claim 1, wherein determining the RA-RNTI for the UE further comprises:
determining the RA-RNTI based at least in part on a slot index within a subframe.

4. The method of claim 1, further comprising:
identifying that a first random access response of the two or more random access responses, corresponding to a first random access resource, is for a first subset of a plurality of UEs that includes the UE, and that a second random access response of the two or more random access responses, corresponding to the first random access resource, is for a second subset of the plurality of UEs.

5. The method of claim 1, further comprising:
determining the RA-RNTI based at least in part on the SSB index when a set of SSBs are mapped to a single random access resource.

6. The method of claim 5, wherein the SSB index is a relative SSB index among the set of SSBs that are mapped to the single random access resource.

7. The method of claim 1, wherein the RA-RNTI is independent from the SSB index of the SSB when a single SSB is mapped to a single random access resource.

8. The method of claim 1, wherein multiple RA-RNTIs are associated with a same random access resource and are associated with one or more corresponding SSBs.

9. The method of claim 1, wherein a single RA-RNTI is associated with multiple random access resources and one or more SSBs of the plurality of SSBs are associated with one or more random access resources.

10. The method of claim 1, wherein a single random access response message, corresponding to a first random access resource, contains information for each UE that transmits a random access preamble within the first random access resource.

11. The method of claim 1, wherein the decoding comprises:
attempting to decode the two or more random access responses according to the ordering.

12. The method of claim 11, wherein the decoding comprises:
discontinuing the decoding upon successful decoding of one of the two or more random access responses.

13. The method of claim 1, wherein a first random access response message includes an indication of one or more preamble IDs, one or more SSBs, one or more random access resources, or any combination thereof, for which the first random access response message is carrying information.

14. The method of claim 13, wherein the indication comprises a flag, a bitmap identifying preambles, one or more SSBs of the plurality of SSBs, the one or more random access resources, specific information for additional random access response messages, or any combination thereof.

15. The method of claim 1, wherein one or more of the two or more random access responses indicates a preamble index.

16. The method of claim 1, further comprising:
identifying configuration information that indicates whether one or multiple RA-RNTIs are configured for one or more SSB, whether single or multiple random access response messages may be received based on the random access preamble, or any combination thereof.

17. The method of claim 16, wherein the configuration information is predetermined configuration information, is received from the network entity, is received from an upper layer, is based on a capability of the UE, is received from a different network entity, is periodically updated by one of the network entity or the different network entity, or any combination thereof.

18. The method of claim 16, wherein different SSBs of the plurality of SSBs may have different configuration information.

19. The method of claim 16, wherein the configuration information is based on a number of actually transmitted SSBs.

20. A method for wireless communication, comprising:
identifying, at a network entity, a configuration for random access resources associated with one or more synchronization signal blocks (SSBs), a number of random access responses that are to be transmitted that are associated with one or more random access resources, and a random access radio network temporary identifier (RA-RNTI) for a control channel transmission associated with the number of random access responses, wherein the configuration indicates a one-to-many mapping or a many-to-one mapping between the one or more random access resources and the one or more SSBs based at least in part on one or more channel conditions of the one or more random access resources, one or more channel conditions of the one or more SSBs, or a combination thereof;
transmitting a plurality of SSBs to at least a first user equipment (UE);
receiving a random access preamble from at least the first UE via a first random access resource;
identifying one or more SSBs associated with the random access preamble based at least in part on the configuration of the random access resources and the first random access resource;
generating a plurality of random access response messages based at least in part on the random access preamble, the plurality of random access response messages including information for at least the first UE, wherein the RA-RNTI is determined based at least in part on one or more of the random access resources, the one or more SSBs, or an SSB index of the one or more SSBs, used for associated random access preambles from one or more UEs;
transmitting control signaling including configuration information that indicates the first UE is to receive multiple random access response messages; and
transmitting, based at least in part on the configuration information, the plurality of random access response messages within a control channel that includes cyclic redundancy check bits scrambled by the RA-RNTI.

21. The method of claim 20, wherein the RA-RNTI for the one or more UEs is determined based at least in part on a symbol index within a slot.

22. The method of claim 20, wherein the RA-RNTI for the one or more UEs is determined based at least in part on a slot index within a subframe.

23. The method of claim 20, wherein the plurality of random access response messages are transmitted, corresponding to the first random access resource, and each random access response is for a different subset of a plurality of UEs.

24. The method of claim 20, wherein multiple RA-RNTIs are associated with a same random access resource and are associated with one or more corresponding SSBs.

25. The method of claim 20, wherein a single RA-RNTI is associated with multiple random access resources and one or more of the SSBs are associated with the one or more random access resources.

26. The method of claim 20, wherein a single random access response message, corresponding to the first random access resource, contains information for each UE that transmits the random access preamble within the first random access resource.

27. The method of claim 20, wherein a first random access response message includes an indication of one or more preamble IDs, the one or more SSBs, the one or more random access resources, or any combination thereof, for which the first random access response message is carrying information.

28. The method of claim 27, wherein the indication comprises a flag, a bitmap identifying preambles, the one or more SSBs, the one or more random access resources, specific information for additional random access response messages, or any combination thereof.

29. The method of claim 20, wherein a first random access response message of the plurality of random access response messages indicates a preamble index.

30. The method of claim 20, wherein the configuration information is predetermined configuration information, is transmitted to UEs, is received from an upper layer, is based on a capability of the first UE, is provided by a different network entity, is periodically updated by one of the network entity or the different network entity, or any combination thereof.

31. The method of claim 20, wherein different SSBs of the plurality of SSBs may have different configuration information.

32. The method of claim 20, wherein the configuration information is based on a number of actually transmitted SSBs.

33. An apparatus for wireless communication, comprising:
a processor; and
a memory coupled with the processor, wherein the memory comprises instructions executable by the processor to cause the apparatus to:
receive, at a user equipment (UE), a synchronization signal block (SSB) of a plurality of SSBs transmitted by a network entity;
identify random access resources for transmitting a random access preamble based at least in part on the received SSB;
transmit the random access preamble to the network entity using the random access resources;
monitor for a plurality of random access responses from the network entity within a control channel that includes cyclic redundancy check bits scrambled by a random access radio network temporary identifier (RA-RNTI);
identify, based at least in part on the monitoring, two or more random access responses;
order the two or more random access responses based at least in part on a quality metric;
determine the RA-RNTI for the UE based at least in part on one or more of the identified random access resources, the SSB, or an SSB index of the SSB; and
decode one or more of the two or more random access responses based at least in part on the RA-RNTI and the ordering.

34. The apparatus of claim 33, wherein the instructions to determine the RA-RNTI for the UE are further executable to:
    determine the RA-RNTI based at least in part on a symbol index within a slot.

35. The apparatus of claim 33, wherein the instructions to determine the RA-RNTI for the UE are further executable to:
    determine the RA-RNTI based at least in part on a slot index within a subframe.

36. The apparatus of claim 33 wherein the instructions to identify the two or more random access responses are further executable to:
    identify that a first random access response of the two or more random access responses, corresponding to a first random access resource, is for a first subset of a plurality of UEs that includes the UE, and that a second random access response of the two or more random access responses, corresponding to the first random access resource, is for a second subset of the plurality of UEs.

37. The apparatus of claim 33, wherein the RA-RNTI is determined based at least in part on the SSB index when a set of SSBs are mapped to a single random access resource.

38. The apparatus of claim 37, wherein the SSB index is a relative SSB index among the set of SSBs that are mapped to the single random access resource.

39. The apparatus of claim 33, wherein the RA-RNTI is independent from the SSB index of the SSB when a single SSB is mapped to a single random access resource.

40. The apparatus of claim 33, wherein multiple RA-RNTIs are associated with a same random access resource and are associated with one or more corresponding SSBs.

41. The apparatus of claim 33, wherein a single RA-RNTI is associated with multiple random access resources and one or more SSBs of the plurality of SSBs are associated with one or more random access resources.

42. The apparatus of claim 33, wherein a single random access response message, corresponding to a first random access resource, contains information for each UE that transmits the random access preamble within the first random access resource.

43. The apparatus of claim 33, wherein the instructions are further executable to:
    attempt to decode the two or more random access responses according to the ordering.

44. The apparatus of claim 43, wherein the instructions are further executable to discontinue the decoding upon successful decoding of one of the two or more random access responses.

45. The apparatus of claim 33, wherein a first random access response message includes an indication of one or more preamble IDs, one or more SSBs, one or more random access resources, or any combination thereof, for which the first random access response message is carrying information.

46. The apparatus of claim 45, wherein the indication comprises a flag, a bitmap identifying preambles, the one or more SSBs of the plurality of SSBs, the one or more random access resources, specific information for additional random access response messages, or any combination thereof.

47. The apparatus of claim 33, wherein one or more of the plurality of random access responses indicates a preamble index.

48. The apparatus of claim 33, wherein the instructions are further executable to:
    identify configuration information that indicates whether one or multiple RA-RNTIs are configured for one or more SSB, whether single or multiple random access response messages may be received based on the random access preamble, or any combination thereof.

49. The apparatus of claim 48, wherein the configuration information is predetermined configuration information, is received from the network entity, is received from an upper layer, is based on a capability of the UE, is received from a different network entity, is periodically updated by one of the network entity or the different network entity, or any combination thereof.

50. The apparatus of claim 48, wherein different SSBs of the plurality of SSBs may have different configuration information.

51. The apparatus of claim 48, wherein the configuration information is based on a number of actually transmitted SSBs.

52. An apparatus for wireless communication, comprising:
    a processor; and
    a memory coupled with the processor, wherein the memory comprises instructions executable by the processor to cause the apparatus to:
    identify, at a network entity, a configuration for random access resources associated with one or more synchronization signal blocks (SSBs), a number of random access responses that are to be transmitted that are associated with one or more random access resources, and a random access radio network temporary identifier (RA-RNTI) for a control channel transmission associated with the number of random access responses, wherein the configuration indicates a one-to-many mapping or a many-to-one mapping between the one or more random access resources and the one or more SSBs based at least in part on one or more channel conditions of the one or more random access resources, one or more channel conditions of the one or more SSBs, or a combination thereof;
    transmit a plurality of SSBs to at least a first user equipment (UE);
    receive a random access preamble from at least the first UE via a first random access resource;
    identify one or more SSBs associated with the random access preamble based at least in part on the configuration of the random access resources and the first random access resource;
    generate a plurality of random access response messages based at least in part on the random access preamble, the plurality of random access response messages including information for at least the first UE, wherein the RA-RNTI is determined based at least in part on one or more of the random access resources, an SSB of the one or more SSBs, or an SSB index of the SSB of the one or more SSBs, used for associated random access preambles from one or more UEs;
    transmit control signaling including configuration information that indicates the first UE is to receive multiple random access response messages; and
    transmit, based at least in part on the configuration information, the plurality of random access response messages within a control channel that includes cyclic redundancy check bits scrambled by the RA-RNTI.

53. The apparatus of claim 52, wherein the RA-RNTI for the one or more UEs is determined based at least in part on a symbol within a slot.

54. The apparatus of claim 52, wherein the RA-RNTI for the one or more UEs is determined based at least in part on a slot index within a subframe.

55. The apparatus of claim 52, wherein two or more random access responses are transmitted, corresponding to the first random access resource, and each random access response is for a different subset of a plurality of UEs.

56. The apparatus of claim 52, wherein multiple RA-RNTIs are associated with a same random access resource and are associated with one or more corresponding SSBs.

57. The apparatus of claim 52, wherein a single RA-RNTI is associated with multiple random access resources and the one or more SSBs are associated with the one or more random access resources.

58. The apparatus of claim 52, wherein a single random access response message, corresponding to the first random access resource, contains information for each UE that transmits the random access preamble within the first random access resource.

59. The apparatus of claim 52, wherein a first random access response message includes an indication of one or more preamble IDs, the one or more SSBs, the one or more random access resources, or any combination thereof, for which the first random access response message is carrying information.

60. The apparatus of claim 59, wherein the indication comprises a flag, a bitmap identifying preambles, the one or more SSBs, the one or more random access resources, specific information for additional random access response messages, or any combination thereof.

61. The apparatus of claim 52, wherein a first random access response message of the plurality of random access response messages indicates a preamble index.

62. The apparatus of claim 52, wherein the configuration information is predetermined configuration information, is transmitted to one or more UEs, is received from an upper layer, is based on a capability of the first UE, is provided by a different network entity, is periodically updated by one of the network entity or the different network entity, or any combination thereof.

63. The apparatus of claim 52, wherein different SSBs of the plurality of SSBs may have different configuration information.

64. The apparatus of claim 52, wherein the configuration information is based on a number of actually transmitted SSBs.

\* \* \* \* \*